(12) United States Patent
Fatin Farhanah et al.

(10) Patent No.: US 11,307,072 B2
(45) Date of Patent: Apr. 19, 2022

(54) PHYSICAL QUANTITY DETECTION DEVICE

(71) Applicant: Hitachi Automotive Systems, Ltd., Hitachinaka (JP)

(72) Inventors: Binti Haridan Fatin Farhanah, Hitachinaka (JP); Takayuki Yogo, Hitachinaka (JP); Noboru Tokuyasu, Hitachinaka (JP); Akira Uenodan, Hitachinaka (JP); Takahiro Miki, Hitachinaka (JP); Hiroaki Hoshika, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/047,468

(22) PCT Filed: Feb. 14, 2019

(86) PCT No.: PCT/JP2019/005217
§ 371 (c)(1),
(2) Date: Oct. 14, 2020

(87) PCT Pub. No.: WO2019/220715
PCT Pub. Date: Nov. 21, 2019

(65) Prior Publication Data
US 2021/0116279 A1 Apr. 22, 2021

(30) Foreign Application Priority Data

May 17, 2018 (JP) .............................. JP2018-095162

(51) Int. Cl.
*G01F 1/684* (2006.01)
*G01F 1/692* (2006.01)
*G01F 15/14* (2006.01)

(52) U.S. Cl.
CPC ............ *G01F 1/6842* (2013.01); *G01F 1/692* (2013.01); *G01F 15/14* (2013.01)

(58) Field of Classification Search
CPC .......... G01F 1/6842; G01F 15/14; G01F 5/00; G01F 1/684
See application file for complete search history.

(56) References Cited

U.S. PATENT DOCUMENTS

2007/0089503 A1* 4/2007 Nakano .................. G01F 1/696
73/204.26
2007/0107511 A1 5/2007 Strohrmann
(Continued)

FOREIGN PATENT DOCUMENTS

JP H08-316606 A 11/1996
JP 2009-109368 A 5/2009
(Continued)

OTHER PUBLICATIONS

International Search Report with English translation and Written Opinion issued in corresponding application No. PCT/JP2019/005217 dated Apr. 9, 2019.

*Primary Examiner* — Francis C Gray
(74) *Attorney, Agent, or Firm* — Foley & Lardner LLP

(57) ABSTRACT

A compact physical quantity detecting device is provided since it is possible to lower the mounting height of a chip package by accommodating the chip package in a notched board. In the physical quantity detecting device of the present invention, a part in a thickness direction of a support body on which a flow rate detection unit and a processing unit are mounted is accommodated in a notch provided in a printed board.

4 Claims, 30 Drawing Sheets

(56) References Cited

U.S. PATENT DOCUMENTS

| | | | | |
|---|---|---|---|---|
| 2009/0173151 | A1* | 7/2009 | Morino | G01F 1/6842 |
| | | | | 73/202.5 |
| 2010/0242591 | A1* | 9/2010 | Nakano | G01F 1/698 |
| | | | | 73/204.26 |
| 2012/0085324 | A1* | 4/2012 | Saito | G01F 5/00 |
| | | | | 123/494 |
| 2012/0160024 | A1* | 6/2012 | Matsumoto | G01K 13/02 |
| | | | | 73/204.11 |
| 2013/0139584 | A1* | 6/2013 | Qasimi | G01F 5/00 |
| | | | | 73/204.21 |
| 2016/0161312 | A1 | 6/2016 | Ogata | |
| 2019/0195709 | A1 | 6/2019 | Ohnishi | |
| 2021/0041275 | A1* | 2/2021 | Yogo | G01F 5/00 |

FOREIGN PATENT DOCUMENTS

| | | |
|---|---|---|
| JP | 2015-21953 A | 2/2015 |
| JP | 2016-194465 A | 11/2016 |
| JP | 2017-219431 A | 12/2017 |

\* cited by examiner

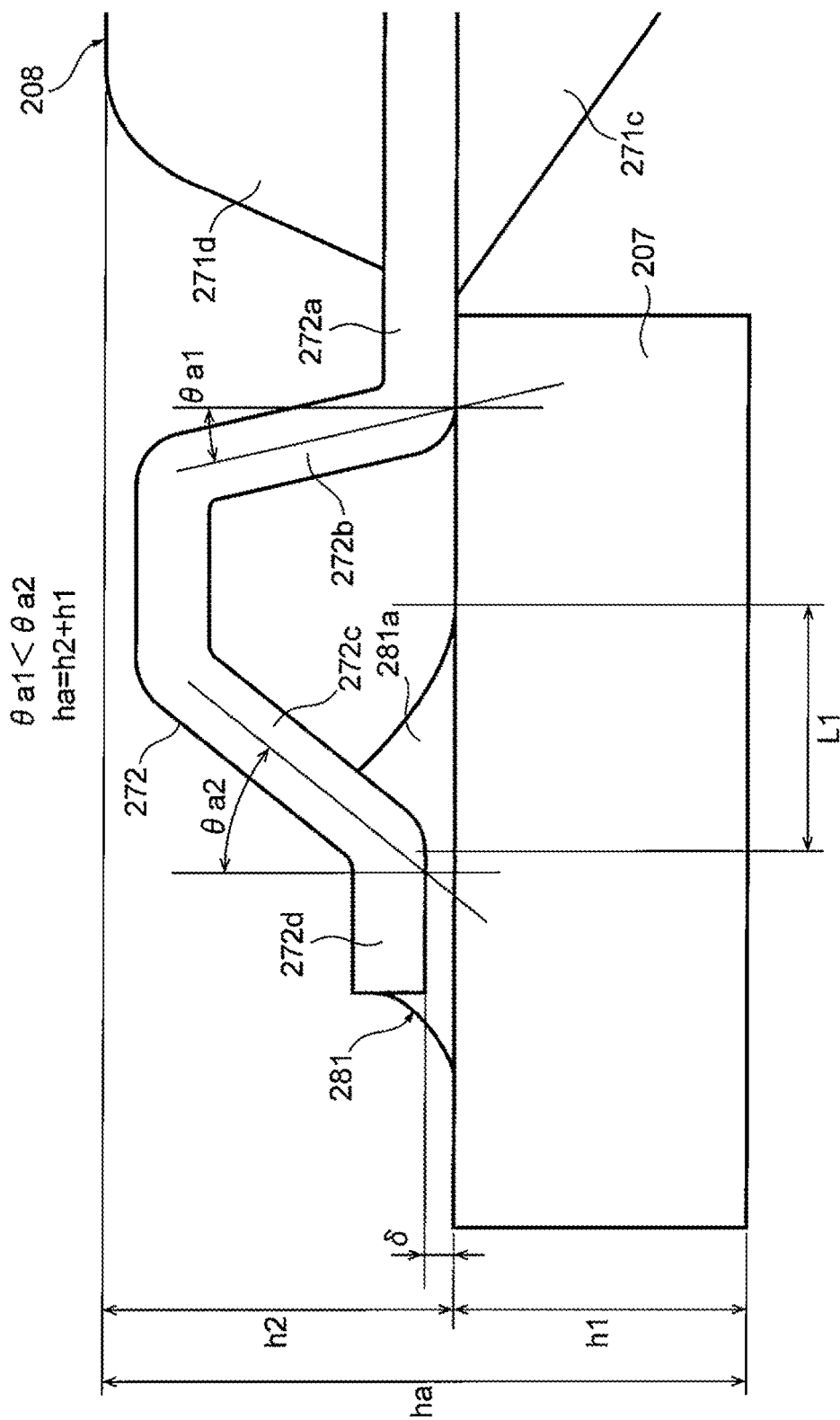

PHYSICAL QUANTITY DETECTION DEVICE

TECHNICAL FIELD

The present invention relates to a physical quantity detecting device that detects a physical quantity of intake air of an internal combustion engine, for example.

BACKGROUND ART

There is an air flow rate measuring device as a device that measures a physical quantity of a gas to be measured flowing through a main passage. In the air flow rate measuring device, a circuit board on which mounting components, such as a pressure sensor, a humidity sensor, an intake air temperature sensor, a memory LSI, and a chip capacitor, are mounted, and a chip package having a built-in flow rate sensor are arranged.

For example, PTL 1 discloses a configuration in which a memory LSI package is stacked in two layers in a recessed portion of a wiring board and electrically connected to the board.

CITATION LIST

Patent Literature

PTL 1: JP H8-316606 A

SUMMARY OF INVENTION

Technical Problem

In the above-described conventional device in PTL 1, the memory LSI package is mounted in the recessed portion of the wiring board in two layers so as to enable mounting of memories more than the number that can be arranged within a limited mounting area, and does not contribute to reduction in size of a sensor device. A sensor that measures a flow rate of intake air drawn into an internal combustion engine requires a downsized structure in order to reduce a pressure loss. In addition, depending on a mounting height, the reliability of a connecting portion of the package is greatly affected by a vertical strain in the Z direction, so that a structure having a large mounting height is not desirable.

The present invention has been made in view of the above points, and an object thereof is to provide a compact physical quantity detecting device capable of lowering a mounting height of a chip package and improving the reliability of a connecting portion of the chip package.

Solution to Problem

A physical quantity detecting device of the present invention that solves the above problems includes: a support body on which a flow rate detection unit and a processing unit are mounted; and a circuit board having an accommodating portion in which a part of the support body is accommodated. In the support body, at least a part in a thickness direction of the support body is accommodated in the accommodating portion, and a part including the flow rate detection unit protrudes from the accommodating portion.

Advantageous Effects of Invention

According to the present invention, the mounting height of the chip package can be suppressed by accommodating a part of the chip package in the accommodating portion of the board. Therefore, the physical quantity detection device itself can be downsized, and the physical quantity detecting device, capable of improving a terminal structure that contributes to the life of a connection portion even if the package mounting is reduced in height, is provided.

Another characteristic relating to the present invention will become apparent from the description of the present specification and the accompanying drawings. In addition, other objects, configurations, and effects will be apparent from the following description of embodiments.

BRIEF DESCRIPTION OF DRAWINGS

FIG. 9 is a view illustrating a bent shape of a connection terminal according to the present embodiment.

DESCRIPTION OF EMBODIMENTS

A mode for carrying out the invention (hereinafter, an embodiment) to be described later solves various problems desired to be solved as an actual product, and particularly solves various types of problems desired for the use as a detection device which detects a physical quantity of intake air of a vehicle, and achieves various effects. One of the various problems to be solved by the following embodiment corresponds to the content that has been described in the above-described section of Technical Problem. In addition, one of the various effects to be achieved by the following embodiment corresponds to the effect described in the above-described section of Advantageous Effects of Invention. The various problems to be solved by the following embodiment and the various effects to be achieved by the following embodiment will be described in the description of the following embodiment. Accordingly, problems and the advantages to be solved and achieved by the following embodiment other than the content in the section of Technical Problem and the content in the section of Advantageous Effects of Invention will also be described in the following embodiment.

In the following embodiment, the same reference signs represent the same configurations even among different drawings, and achieve the same effects. There is also a case in which only a reference sign is given to a configuration that has already been described in a drawing and a description thereof is omitted.

Figure 1:
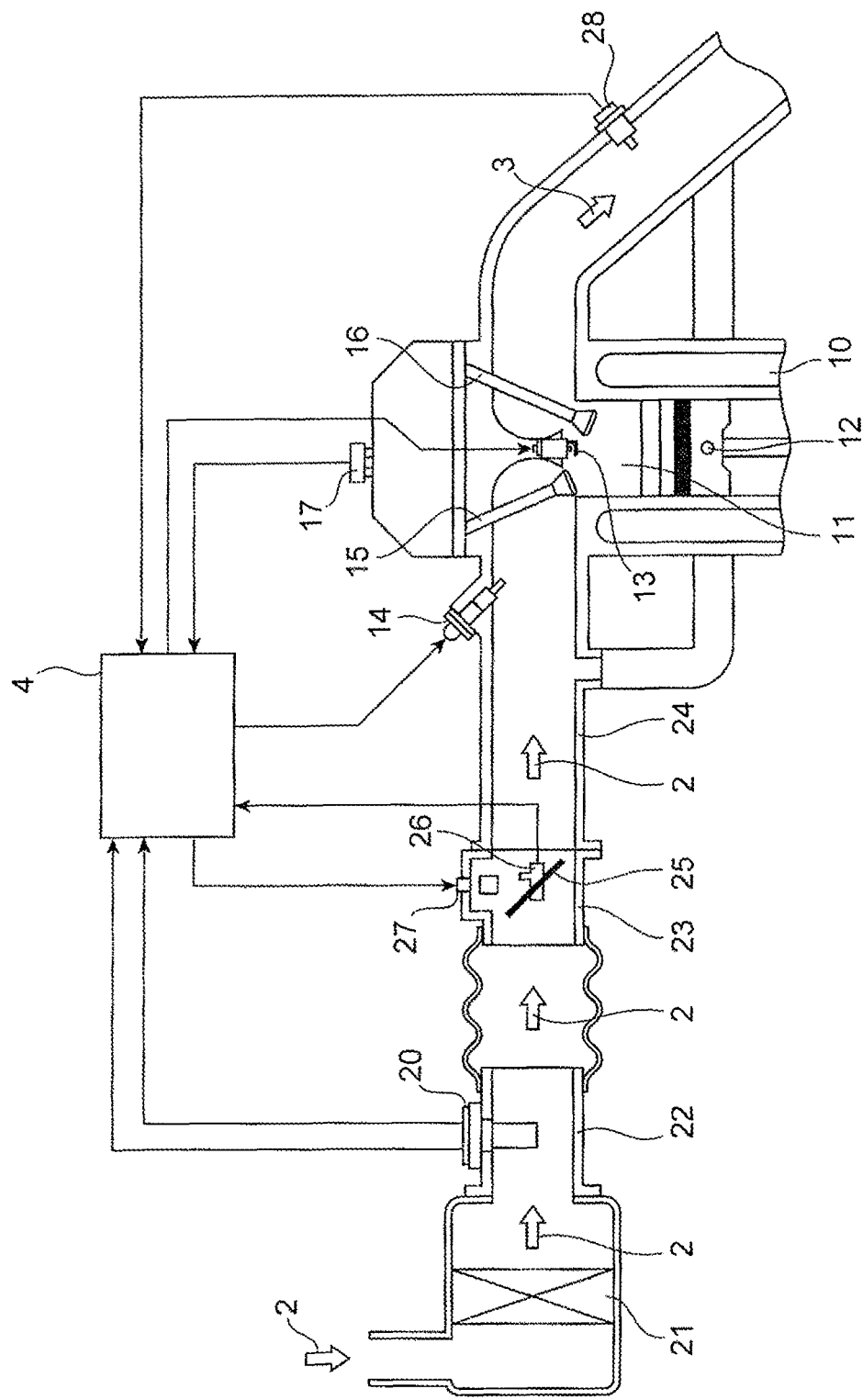
FIG. 1 is a system diagram illustrating an embodiment in which a physical quantity detecting device according to the present invention is used in an internal combustion engine control system.

FIG. 1 is a system diagram illustrating the embodiment in which the physical quantity detecting device according to the present invention is used in an electronic fuel injection-type internal combustion engine control system 1. Intake air is sucked from an air cleaner 21 as a gas 2 to be measured based on an operation of an internal combustion engine 10, which includes an engine cylinder 11 and an engine piston 12, and is guided to a combustion chamber of the engine cylinder 11 via, for example, an intake body as a main passage 22, a throttle body 23, and an intake manifold 24. A physical quantity of the gas 2 to be measured, which is the intake air guided to the combustion chamber, is detected by a physical quantity detecting device 20 according to the present invention. Fuel is supplied by a fuel injection valve 14 on the basis of the detected physical quantity, and is guided to the combustion chamber in the state as an air-fuel mixture with the gas 2 to be measured. Incidentally, the fuel injection valve 14 is provided at an intake port of the internal combustion engine in the present embodiment, and the fuel injected to the intake port molds the air-fuel mixture together with the gas 2 to be measured. The air-fuel mixture is guided to the combustion chamber via an intake valve 15 and is burnt to generate mechanical energy.

The fuel and air guided to the combustion chamber form a mixed state of the fuel and the air, and is explosively burnt by spark ignition of a spark plug 13, thereby generating the mechanical energy. After burning, the gas is guided into an exhaust pipe from an exhaust valve 16, and is discharged, as an exhaust gas 3, outside a car from the exhaust pipe. A flow rate of the gas 2 to be measured as the intake air guided to the combustion chamber is controlled by a throttle valve 25 whose opening degree is changed based on an operation of an accelerator pedal. A supply amount of fuel is controlled on the basis of the flow rate of the intake air guided to the combustion chamber, and a driver can control the mechanical energy generated by the internal combustion engine by controlling the opening degree of the throttle valve 25 and controlling the flow rate of the intake air guided to the combustion chamber.

<Overview of Control of Internal Combustion Engine Control System>

The physical quantity, such as the flow rate, temperature, humidity, and pressure, of the gas 2 to be measured, which is the intake air taken from the air cleaner 21 and flowing in the main passage 22, is detected by the physical quantity detecting device 20, and an electric signal indicating the physical quantity of the intake air is input to a control device 4 from the physical quantity detecting device 20. In addition, an output of a throttle angle sensor 26, which measures the opening degree of the throttle valve 25, is input to the control device 4. Further, an output of a rotation angle sensor 17 is input to the control device 4 in order to measure a position or a state of the engine piston 12, the intake valve 15, or the exhaust valve 16 of the internal combustion engine, and rotation speed of the internal combustion engine. An output of an oxygen sensor 28 is input to the control device 4 in order to measure a state of a mixing ratio between the amount of fuel and the amount of air based on the state of the exhaust gas 3.

The control device 4 computes a fuel injection amount and an ignition timing on the basis of the physical quantity of the intake air as the output of the physical quantity detecting device 20 and the rotation speed of the internal combustion engine measured on the basis of the output of the rotation angle sensor 17. The fuel amount to be supplied from the fuel injection valve 14 and the ignition timing ignited by the spark plug 13 are controlled on the basis of these computation results. Practically, the supply amount of fuel and the ignition timing are further finely controlled on the basis of a change state of the temperature or a throttle angle detected by the physical quantity detecting device 20, a change state of the engine rotation speed, and a state of an air-fuel ratio measured by the oxygen sensor 28. The control device 4 further controls the amount of air bypassing the throttle valve 25 using an idle air control valve 27 in an idle operation state of the internal combustion engine and controls the rotation speed of the internal combustion engine in the idle operation state.

Both the supply amount of fuel and the ignition timing, which are major control variables of the internal combustion engine, are computed using the output of the physical quantity detecting device 20 as the main parameter. Accordingly, improvement of detection accuracy of the physical quantity detecting device 20, suppression of a change over time, and improvement of reliability are important in regard to improvement of control accuracy of a vehicle and securing of the reliability.

In particular, recently, a request for fuel saving of vehicles has extremely increased, and further, a request for purification of an exhaust gas has extremely increased. In order to respond to such requests, it is very important to improve the detection accuracy of the physical quantity of the gas 2 to be measured which is the intake air detected by the physical quantity detecting device 20. In addition, it is also important for the physical quantity detecting device 20 to maintain high reliability.

A vehicle to which the physical quantity detecting device 20 is equipped is used under environment where a change in temperature or humidity is great. It is desirable that the physical quantity detecting device 20 be configured on consideration of response to such a change in temperature or humidity in the use environment and response to dust, pollutants, and the like.

In addition, the physical quantity detecting device 20 is mounted to the intake pipe which is affected by heat generated from the internal combustion engine. Thus, the heat generated from the internal combustion engine is transferred to the physical quantity detecting device 20 via the intake pipe serving as the main passage 22. The physical quantity detecting device 20 detects the flow rate of the gas 2 to be measured by performing the heat transfer with the gas 2 to be measured, and thus, it is important to suppress influence of heat from the outside as much as possible.

The physical quantity detecting device 20 equipped in the car, as will be described later, not only solves the problem described in the section of Technical Problem and achieves the effects described in the section of Advantageous Effects of Invention but also solves various problems and achieves various effects which are required as the product on sufficient consideration of the above-described various problems as will be described later. Specific problems to be solved and specific effects to be achieved by the physical quantity detecting device 20 will be described in the following description of the embodiment.

<Appearance Structure of Physical Quantity Detecting Device>

FIGS. 2A to 2F are views illustrating an appearance of the physical quantity detecting device. Incidentally, it is assumed that the gas to be measured flows along the central axis of the main passage in the following description.

The physical quantity detecting device 20 is used by being inserted inside the main passage 22 through an attachment hole provided in a passage wall of the main passage 22. The physical quantity detecting device 20 includes a housing 201 and a cover 202 attached to the housing 201. The housing 201 is configured by injection-molding a synthetic resin material, and the cover 202 is formed using a plate-shaped member made of a conductive material such as an aluminum alloy. The cover 202 is formed in a thin plate shape and have a wide flat cooling surface.

The housing 201 includes: a flange 211 configured to fix the physical quantity detecting device 20 to the intake body as the main passage 22; a connector 212 protruding from the flange 211 and exposed to the outside from the intake body to perform electrical connection with an external device; and a measurement unit 213 which extends to protrude from the flange 211 toward the center of the main passage 22.

The measurement unit 213 has a thin and long shape extending from the flange 211 toward the center of the main passage 22, and has wide front surface 221 and back surface 222, and a pair of narrow side surfaces 223 and 224. The measurement unit 213 protrudes from an inner wall of the main passage 22 toward a passage center of the main passage 22 in a state where the physical quantity detecting device 20 is attached to the main passage 22. Then, the front surface 221 and the back surface 222 are arranged in parallel along the central axis of the main passage 22. Between the narrow side surfaces 223 and 224 of the measurement unit 213, the side surface 223 on one side of the measurement unit 213 in the lateral direction is arranged to face the upstream side of the main passage 22, and the side surface 224 on the other side of the measurement unit 213 in the lateral direction is arranged to face the downstream side of the main passage 22. In the state where the physical quantity detecting device 20 is attached to the main passage 22, a distal end portion of the measurement unit 213 serves as a lower surface 226.

Since a sub-passage inlet 231 is provided at the distal end portion of the measurement unit 213 extending from the flange 211 toward the center of the main passage 22 in the physical quantity detecting device 20, a gas in a portion near the central portion away from an inner wall surface, instead of the vicinity of the inner wall surface of the main passage 22, can be taken into a sub-passage. Thus, the physical quantity detecting device 20 can measure the flow rate of the gas in the portion away from the inner wall surface of the main passage 22, and can suppress a decrease in measurement accuracy caused by the influence of heat or the like.

The vicinity of the inner wall surface of the main passage 22 is in the state of being easily affected by the temperature of the main passage 22 so that the temperature of the gas 2 to be measured is different from the original temperature of the gas, which is different from an average state of the main gas in the main passage 22. In particular, when the main passage 22 is the intake body of the engine, it is often maintained at a high temperature due to the influence of heat from the engine. Thus, the gas in the vicinity of the inner wall surface of the main passage 22 is often higher than the original temperature of the main passage 22, which causes a decrease in measurement accuracy. In addition, in the vicinity of the inner wall surface of the main passage 22, the fluid resistance is large, and a flow velocity becomes lower than an average flow velocity of the main passage 22. Thus, if the gas in the vicinity of the inner wall surface of the main passage 22 is taken into the sub-passage as the gas 2 to be measured, there is a possibility that the decrease in the flow velocity with respect to the average flow velocity of the main passage 22 leads to a measurement error.

Since the physical quantity detecting device 20 is provided with the sub-passage inlet 231 at the distal end portion of the thin and long measurement unit 213 extending from the flange 211 toward the center of the main passage 22, it is possible to reduce the measurement error relating to the decrease in the flow velocity in the vicinity of the inner wall surface. In addition, not only the sub-passage inlet 231 is provided at the distal end portion of the measurement unit 213 extending from the flange 211 toward the center of the main passage 22 but also a first outlet 232 and a second outlet 233 of the sub-passage are provided at the distal end portion of the measurement unit 213 in the physical quantity detecting device 20, and thus, the measurement error can be further reduced.

Figure 2A:
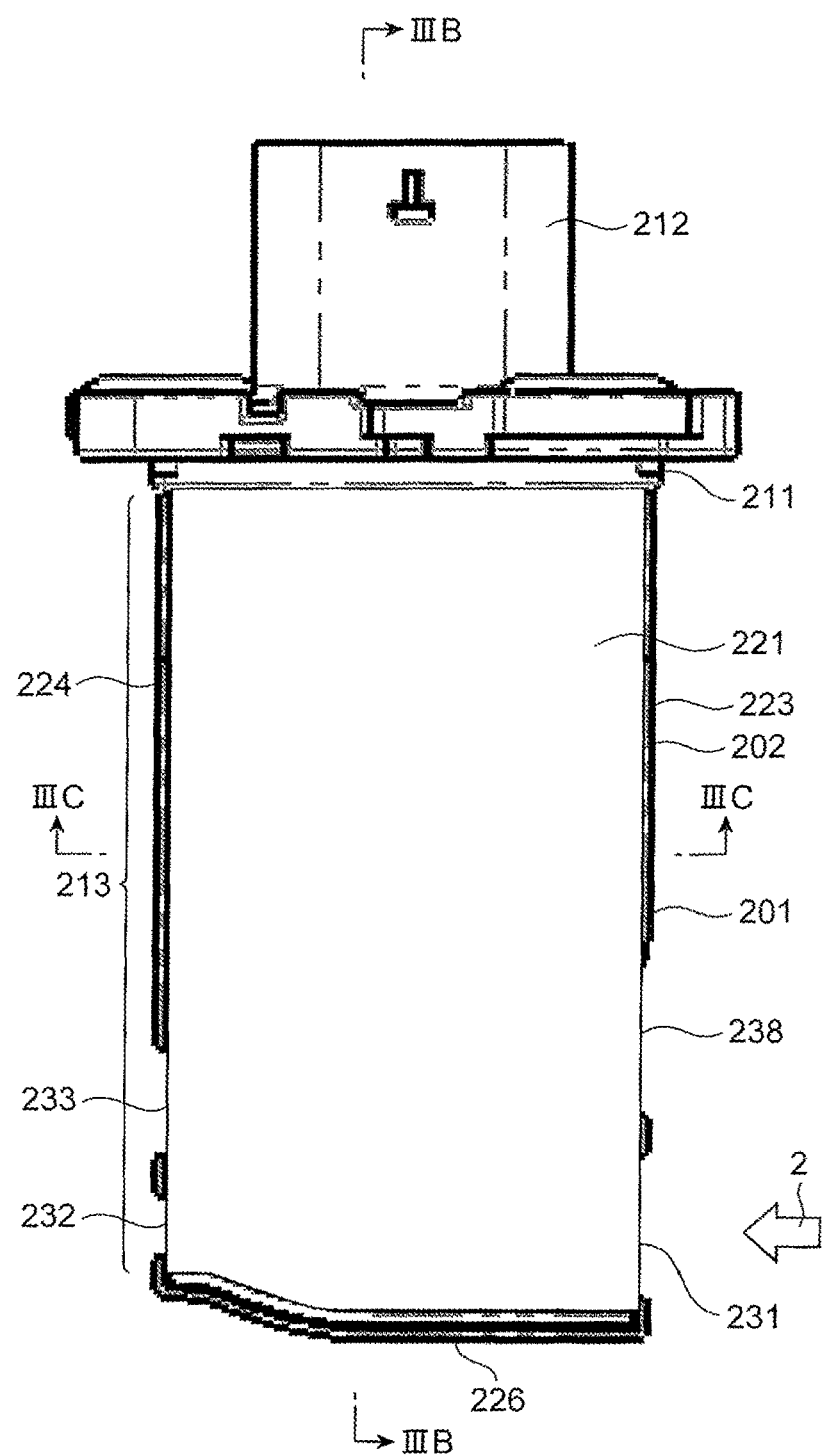
FIG. 2A is a front view of the physical quantity detecting device.
Figure 2B:
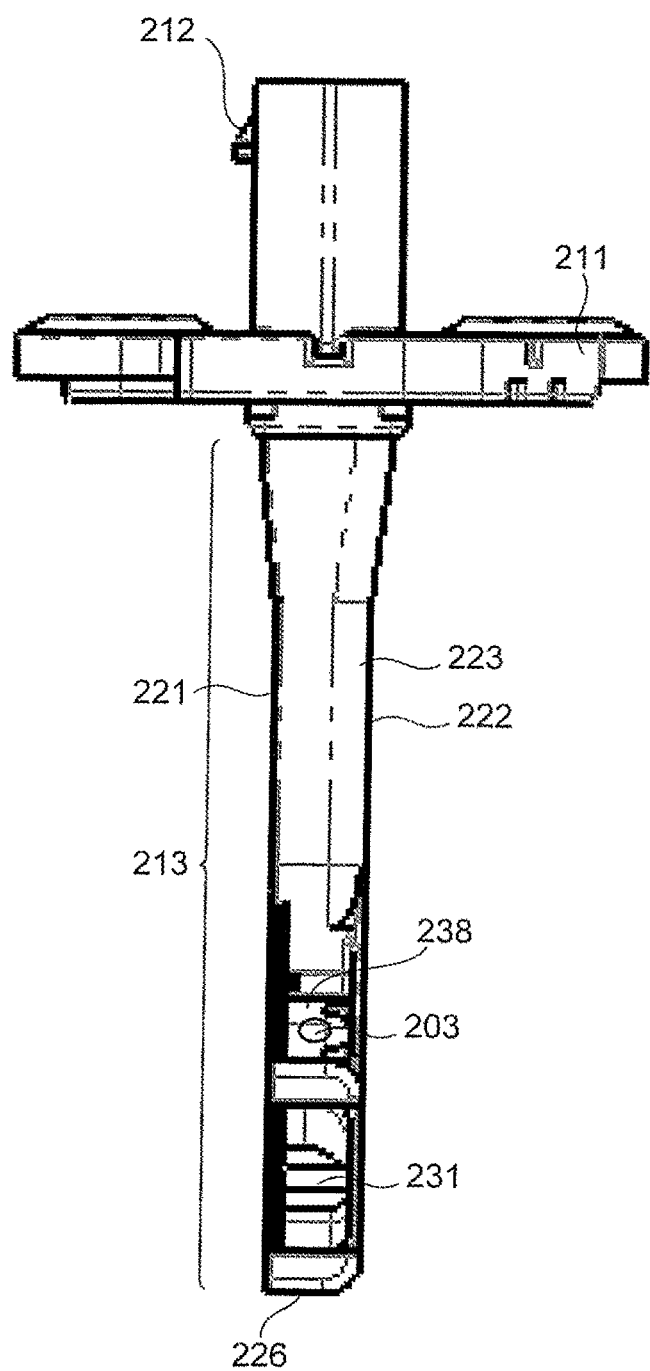
FIG. 2B is a right side view of the physical quantity detecting device.
Figure 2C:
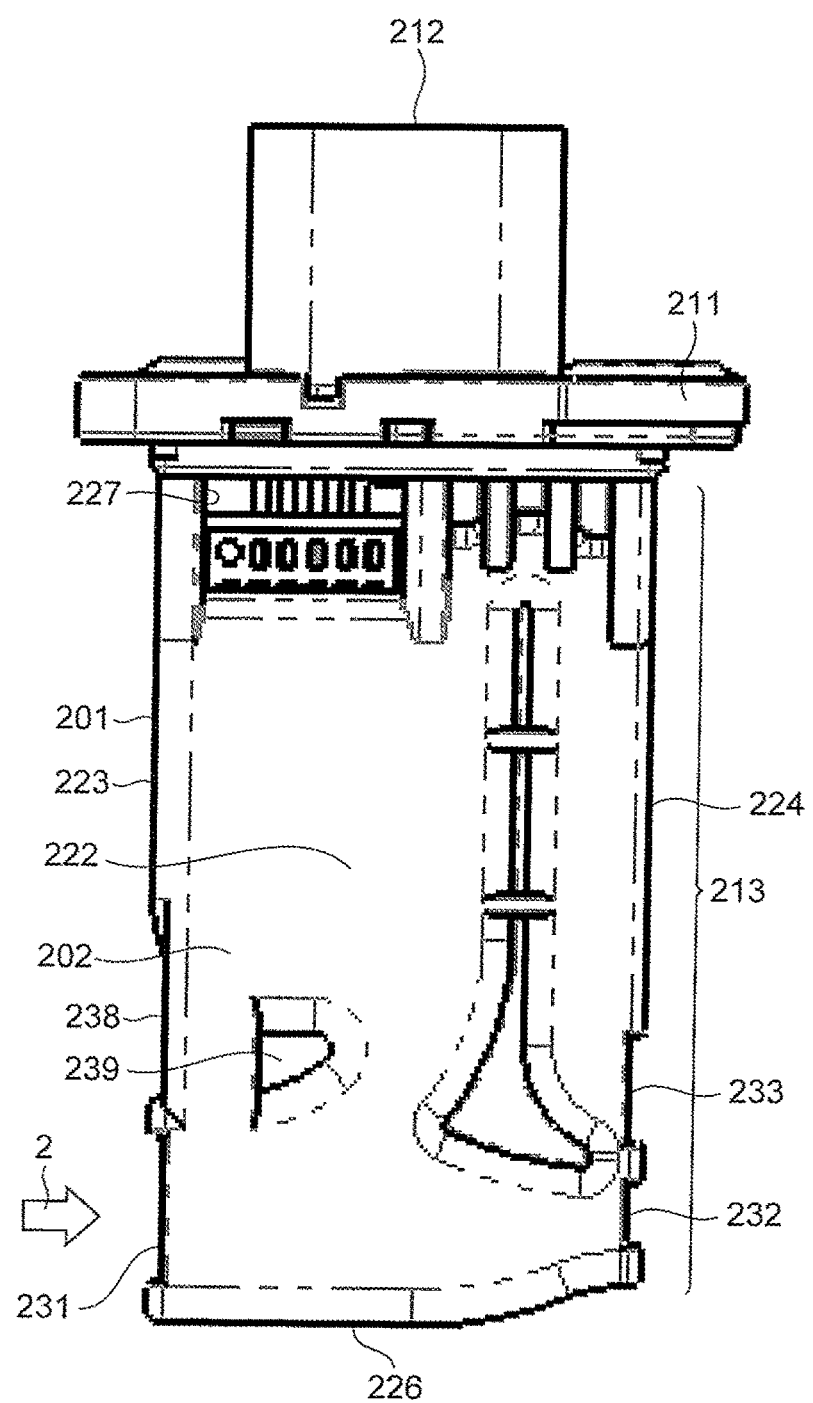
FIG. 2C is a back view of the physical quantity detecting device.
Figure 2D:
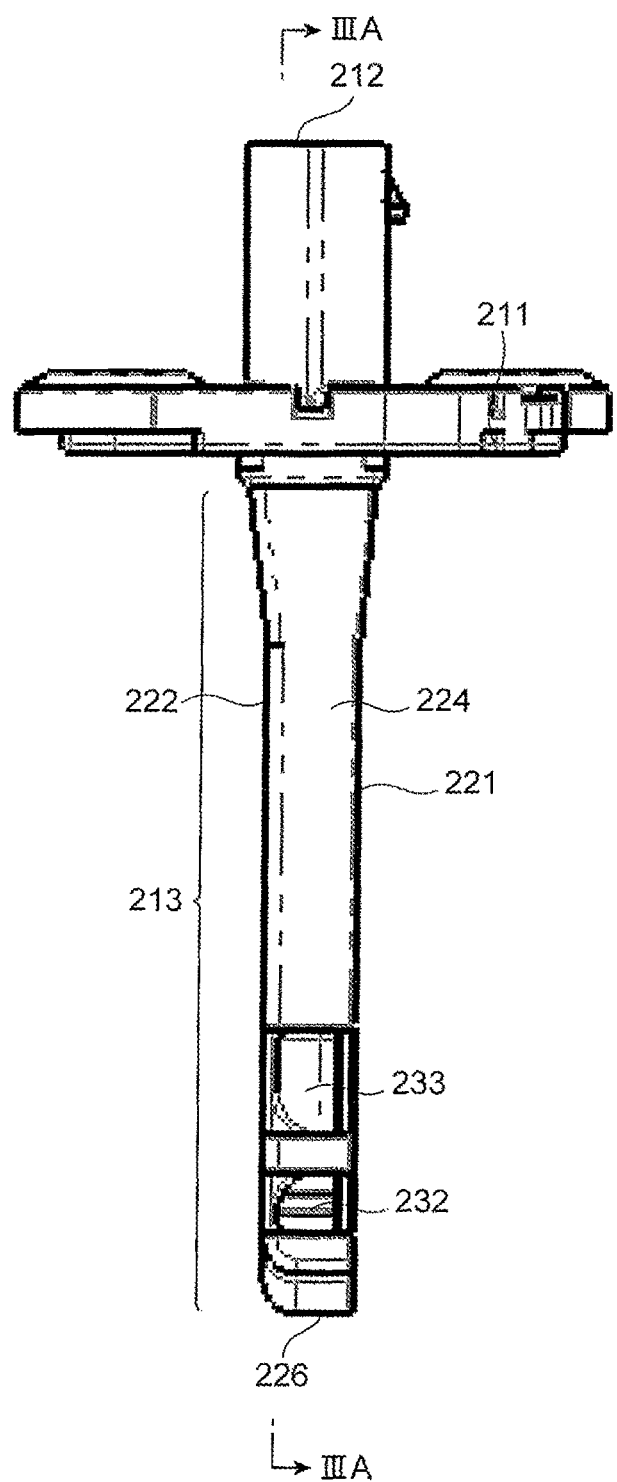
FIG. 2D is a left side view of the physical quantity detecting device.

The physical quantity detecting device 20 has a shape in which the measurement unit 213 extends to be long along the axis from an outer wall of the main passage 22 toward the center, and the widths of the side surfaces 223 and 224 have a narrow shape as illustrated in FIGS. 2B and 2D. As a result, the physical quantity detecting device 20 can suppress the fluid resistance of the gas 2 to be measured to a small value.

<Structure of Temperature Detection Unit>

In the physical quantity detecting device 20, an intake air temperature sensor 203, which is a temperature detection unit, is provided in the measurement unit 213 as illustrated in FIG. 2B. The intake air temperature sensor 203 is arranged in the middle of a passage of a temperature measurement passage having one end 238 open near the sub-passage inlet 231 and another end 239 open to the back surface 222 of the measurement unit 213. The temperature measurement passage is constituted by the housing 201 and the cover 202.

Figure 6A:
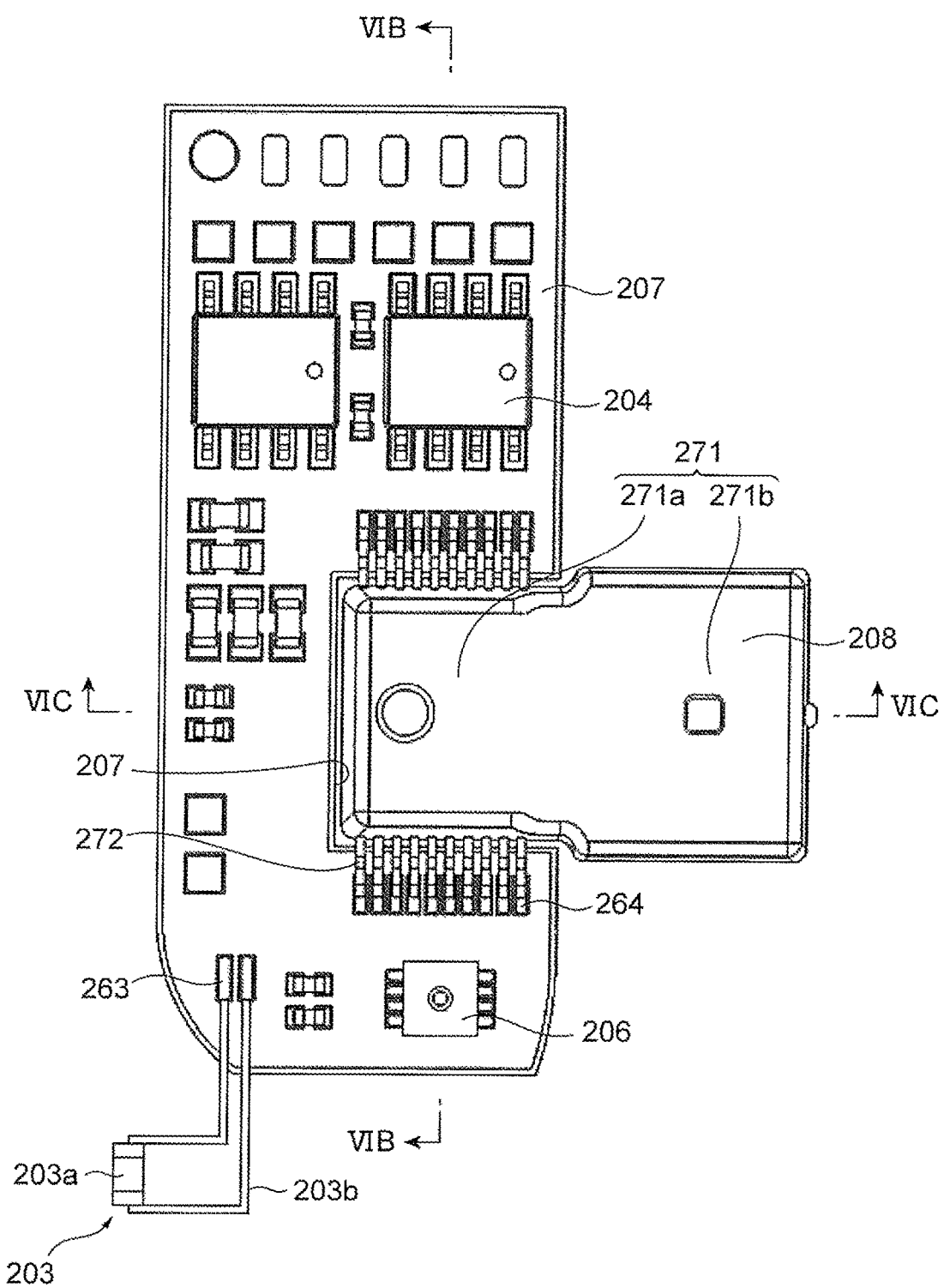
FIG. 6A is a front view of a circuit board on which a chip package and circuit components are mounted.

As illustrated in FIG. 6A, the intake air temperature sensor 203 is formed of an axial lead component having a columnar sensor body 203a and a pair of leads 203b which protrudes in directions away from each other from both axial end portions of the sensor body 203a. The intake air temperature sensor 203 is mounted on a circuit board 207 in the measurement unit 213 via the leads 203b. and the sensor body 203a is arranged to be orthogonal to the flow direction of the gas 2 to be measured in the temperature measurement passage.

Since the intake air temperature sensor 203 is arranged in the temperature measurement passage constituted by the housing 201 and the cover 202, it is possible to prevent the intake air temperature sensor 203 from coming into direct contact with another object and being damaged during transport or attachment work of the physical quantity detecting device 20.

According to the physical quantity detecting device 20 of the present embodiment, the intake air temperature sensor 203 is arranged on the upstream side of the measurement unit 213, and thus, it is possible to make the gas 2 to be measured flowing straight from the upstream side direct contact with the intake air temperature sensor 203. Therefore, heat dissipation properties of the intake air temperature sensor 203 can be improved.

<Structure of Flange>

Figure 2E:
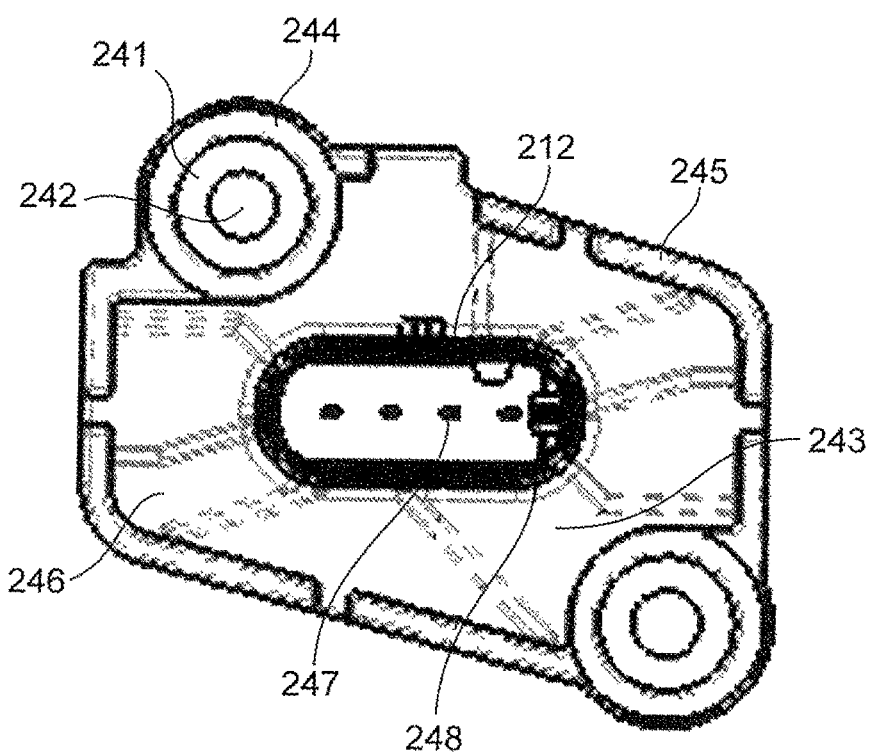
FIG. 2E is a plan view of the physical quantity detecting device.
Figure 2F:
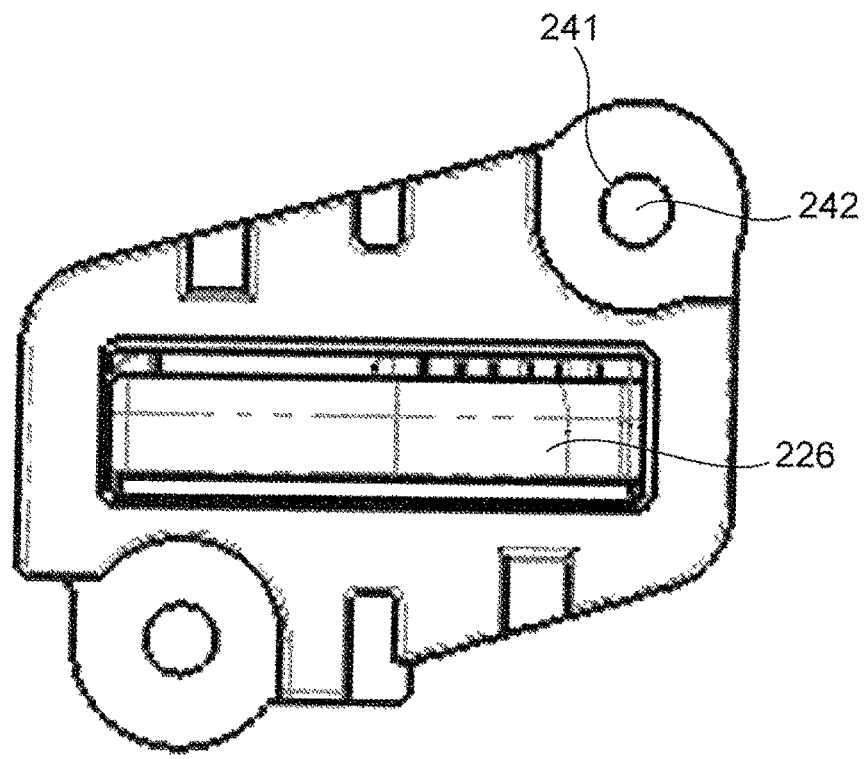
FIG. 2F is a bottom view of the physical quantity detecting device.

The measurement unit 213 of the physical quantity detecting device 20 is inserted inside through the attachment hole provided in the main passage 22, and the flange 211 of the physical quantity detecting device 20 abuts on the main passage 22, and is fixed to the main passage 22 with a screw. The flange 211 has a substantially rectangular shape in a plan view with a predetermined plate thickness, and a pair of fixing holes 241 is provided at diagonal corners as illustrated in FIGS. 2E and 2F. The fixing hole 241 has a through-hole 242 penetrating the flange 211. The flange 211 is fixed to the main passage 22 by inserting a fixing screw (not illustrated) into the through-hole 242 of the fixing hole 241 and screwing the screw into a screw hole of the main passage 22.

As illustrated in FIG. 2E, a plurality of ribs is provided on an upper surface of the flange 211. The ribs include: a first rib 243 that linearly connects the fixing hole 241 and the connector 212; a second rib 244 having a tapered cross section that surrounds the periphery of the through-hole 242 of the fixing hole 241; a third rib 245 provided along an outer peripheral portion of the flange 211; and a fourth rib 246 that extends in a direction of intersecting the first rib 243 on a diagonal of the flange 211.

The first rib 243 is linearly provided between the fixing hole 241 on which a screw fixing force acts on the main passage 22 and the connector 212 having a relatively high rigidity due to its three-dimensional shape, and thus, a flange reinforcing effect is high. Therefore, as compared with the one having no first rib 243, the thickness of the flange 211 can be reduced, the weight of the entire housing can be reduced, and it is possible to reduce the influence of shrinkage of resin constituting the flange 211 during molding of the housing 201.

As illustrated in FIG. 2E, the connector 212 is provided with four external terminals 247 and correction terminals 248 therein. The external terminals 247 serve as a terminal to output a physical quantity, such as a flow rate and temperature, which is a measurement result of the physical quantity detecting device 20, and a power supply terminal to supply DC power for the operation of the physical quantity detecting device 20.

The correction terminal 248 is a terminal used to measure the produced physical quantity detecting devices 20, obtain a correction value for each of the physical quantity detecting devices 20, and store the correction value in a memory inside the physical quantity detecting device 20. In the subsequent measurement operation of the physical quantity detecting device 20, correction data representing the above-described correction value stored in the memory is used, and the correction terminal 248 is not used.

Therefore, the correction terminal 248 has a shape different from that of the external terminal 247 such that the correction terminal 248 does not interfere when the external terminal 247 is connected to another external device. In the present embodiment, the correction terminal 248 has a shorter shape than the external terminal 247 so as not to interfere with the connection even if a connection terminal to the external device connected to the external terminal 247 is inserted into the connector 212.

<Overall Structure of Housing>

Figure 3A:
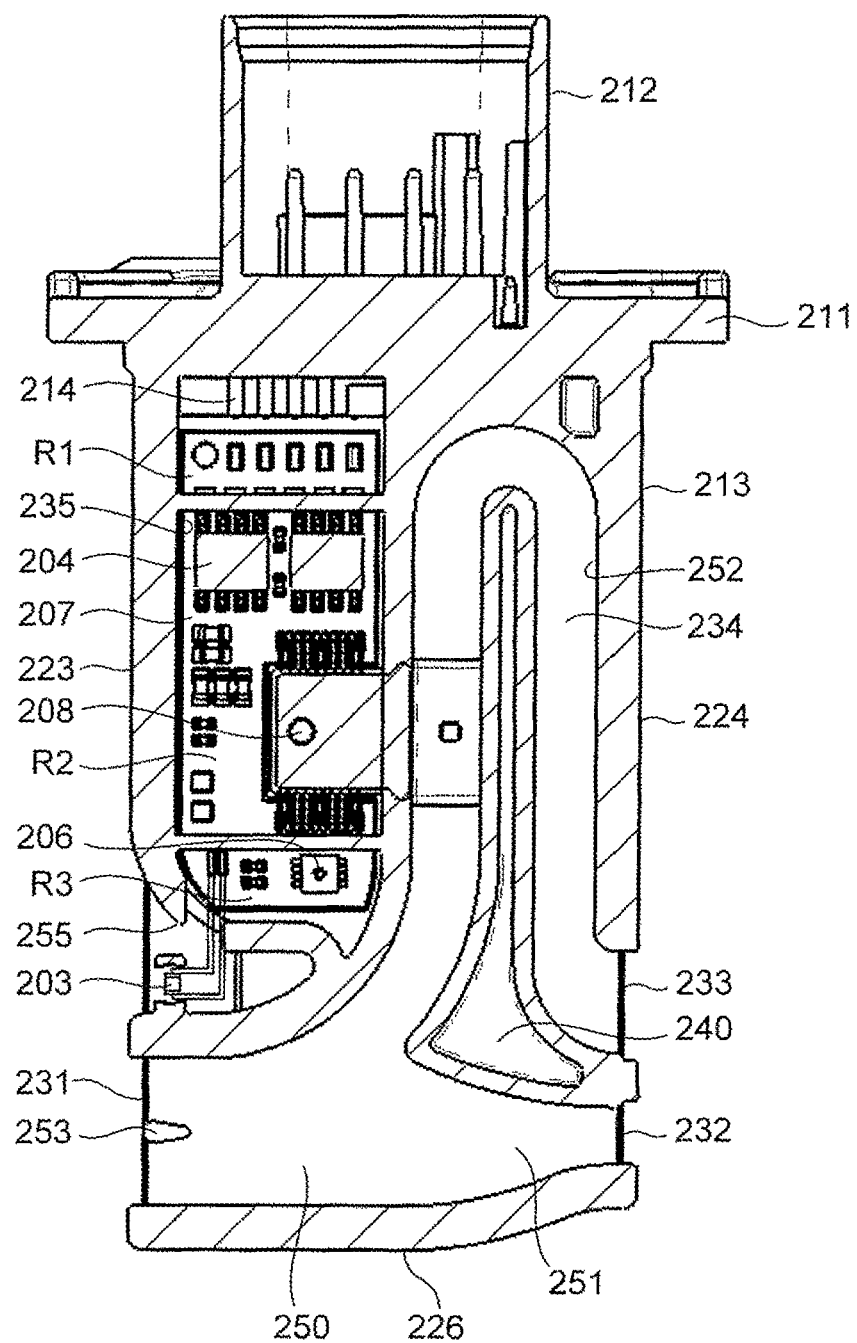
FIG. 3A is a cross-sectional view taken along the line IIIA-IIIA of FIG. 2D.
Figure 3B:
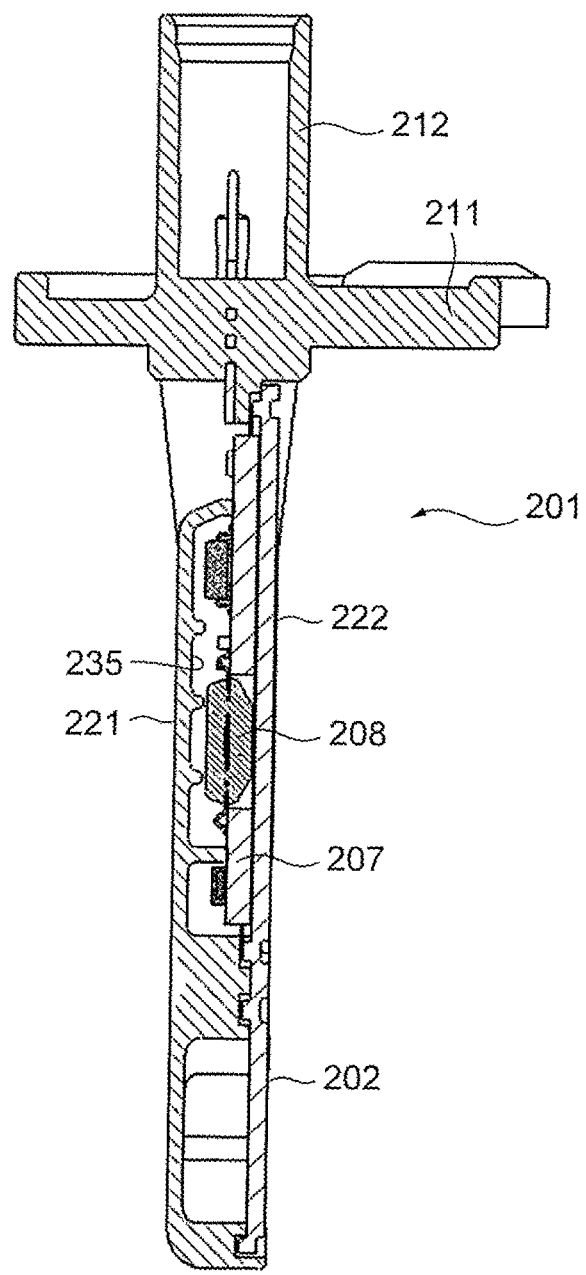
FIG. 3B is a cross-sectional view taken along the line IIIB-IIIB of FIG. 2A.
Figure 3C:
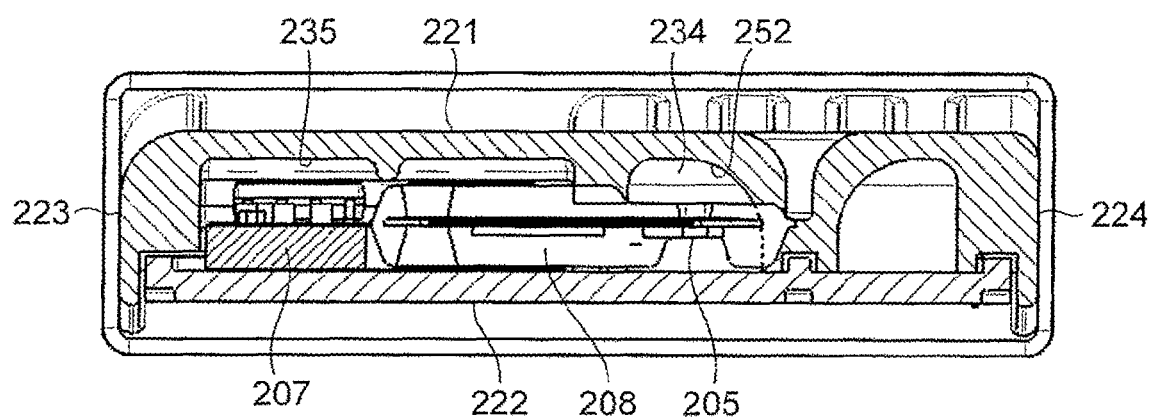
FIG. 3C is a cross-sectional view taken along the line IIIC-IIIC of FIG. 2A.
Figure 3D:
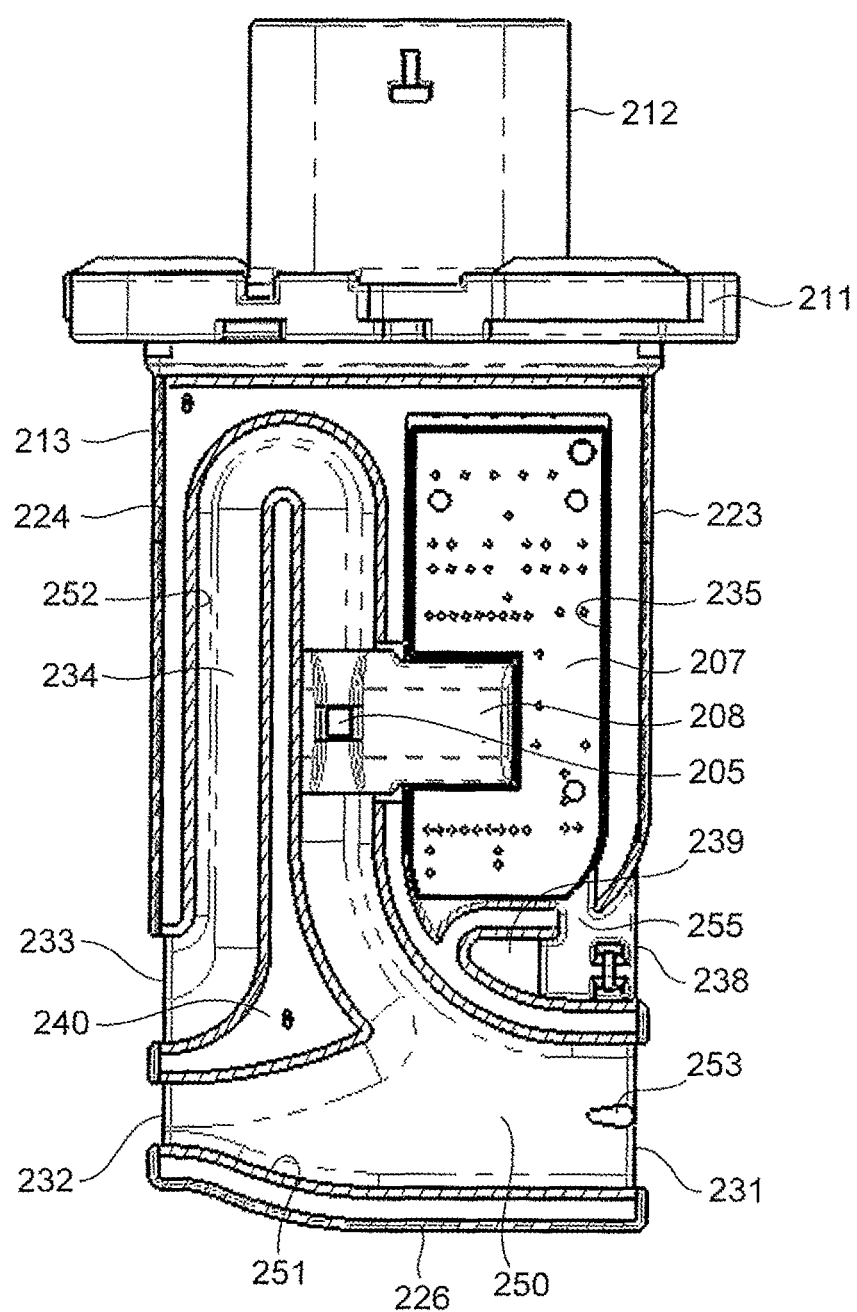
FIG. 3D is a front view of a housing from which only a cover has been removed.

FIG. 3A is a cross-sectional view taken along the line IIIA-IIIA of FIG. 2D, FIG. 3B is a cross-sectional view taken along the line IIIB-IIIB of FIG. 2A, FIG. 3C is a cross-sectional view taken along the line IIIC-IIIC of FIG. 2A, and FIG. 3D is a front view of a housing from which only the cover has been removed.

As illustrated in FIG. 3D, the housing 201 is provided with a sub-passage groove 250 configured to form the sub-passage 234 and a circuit chamber 235 configured to accommodate the circuit board 207. The circuit chamber 235 and the sub-passage groove 250 are provided to be recessed on the front surface of the measurement unit 213. The circuit chamber 235 is provided in a region on one side in the lateral direction (on the side surface 223 side) of the main passage 22 which is located on the upstream side in the flow direction of the gas 2 to be measured. Then, the sub-passage groove 250 is provided over a region closer to the distal end side (the lower surface 226 side) in the longitudinal direction of the measurement unit 213 than the circuit chamber 235 and a region closer to the other side (the side surface 224 side) in the lateral direction of the main passage 22, which is located on the downstream side in the flow direction of the gas 2 to be measured, than the circuit chamber 235.

The sub-passage groove 250 forms a sub-passage 234 in cooperation with the cover 202. The sub-passage 234 is provided so as to extend along a protruding direction (longitudinal direction) of the measurement unit. The sub-passage groove 250 forming the sub-passage 234 has a first sub-passage groove 251 and a second sub-passage groove 252 that branches in the middle of the first sub-passage groove 251. The first sub-passage groove 251 is formed to extend along the lateral direction of the measurement unit 213 between the sub-passage inlet 231 that is open on the side surface 223 on one side of the measurement unit 213 and the first outlet 232 open on the side surface 224 on the other side of the measurement unit 213. The first sub-passage groove 251 forms a first sub-passage that takes the gas 2 to be measured flowing in the main passage 22 from the sub-passage inlet 231 and returns the taken gas 2 to be measured from the first outlet 232 to the main passage 22. The first sub-passage extends from the sub-passage inlet 231 along the flow direction of the gas 2 to be measured in the main passage 22, and is connected to the first outlet 232.

The second sub-passage groove 252 branches at an intermediate position of the first sub-passage groove 251, is bent toward a proximal end portion side (flange side) of the measurement unit 213, and extends along the longitudinal direction of the measurement unit 213. Then, the second sub-passage groove 252 is bent at the proximal end portion of the measurement unit 213 toward the other side (side surface 224 side) in the lateral direction of the measurement unit 213, makes a U-turn toward the distal end portion of the measurement unit 213, and extends again along the longitudinal direction of the measurement unit 213. Then, the second sub-passage groove 252 is bent in front of the first outlet 232 toward the other side in the lateral direction of the measurement unit 213, and is provided to be continuous with the second outlet 233 that is open to the side surface 224 on the other side of the measurement unit 213. The second outlet 233 is arranged so as to face the downstream side in the flow direction of the gas 2 to be measured in the main passage 22. The second outlet 233 has an opening area substantially equal to or slightly larger than that of the first outlet 232, and is formed at a position more adjacent to the proximal end portion side in the longitudinal direction of the measurement unit 213 than the first outlet 232.

The second sub-passage groove 252 forms a second sub-passage which allows the gas 2 to be measured having branched and flowed from the first sub-passage to pass therethrough to return the gas 2 to be measured from the second outlet 233 to the main passage 22. The second sub-passage has a path that reciprocates along the longitudinal direction of the measurement unit 213.

That is, the second sub-passage has a path that branches in the middle of the first sub-passage, extends toward the proximal end portion side of the measurement unit 213, is folded back at the proximal end portion side of the measurement unit 213 to extend toward the distal end portion side of the measurement unit 213, and leads to the second outlet 233 which is arranged on the downstream side of the sub-passage inlet 231 in the flow direction of the gas 2 to be measured in the main passage 22 to face the downstream side in the flow direction of the gas 2 to be measured. A flow rate sensor 205 is arranged at an intermediate position of the second sub-passage groove 252. The second sub-passage groove 252 can secure a longer passage length of the second sub-passage, and can reduce the influence on the flow rate sensor 205 when pulsation occurs in the main passage.

According to the above configuration, the sub-passage 234 can be formed along an extending direction of the measurement unit 213, and the length of the sub-passage 234 can be sufficiently secured to be long. As a result, the physical quantity detecting device 20 can include the sub-passage 234 having a sufficient length. Therefore, the physical quantity detecting device 20 can measure the physical quantity of the gas 2 to be measured with high accuracy while suppressing the fluid resistance to the small value.

The first sub-passage groove 251 is provided to extend from the sub-passage inlet 231 to the first outlet 232 along the lateral direction of the measurement unit 213, and thus, foreign matter such as dust that has entered the first sub-passage from the sub-passage inlet 231 can be discharged directly from the first outlet 232. Therefore, it is possible to prevent the foreign matter from entering the second sub-passage and prevent the flow rate sensor 205 in the second sub-passage from being affected.

The sub-passage inlet 231 and the first outlet 232 of the first sub-passage groove 251 have a larger opening area at the sub-passage inlet 231 than at the first outlet 232. Since the opening area of the sub-passage inlet 231 is larger than that of the first outlet 232, the gas 2 to be measured that has flowed into the first sub-passage can be reliably guided to the second sub-passage that branches in the middle of the first sub-passage.

At the sub-passage inlet 231 of the first sub-passage groove 251, a protrusion 253 is provided at a central position in the longitudinal direction. The protrusion 253 divides a size of the sub-passage inlet 231 into two equal parts in the longitudinal direction to make each part have a smaller opening area than the first outlet 232 and the second outlet 233. The protrusion 253 regulates a size of foreign matter that can enter the first sub-passage from the sub-passage inlet 231 only to a size smaller than the first outlet 232 and the second outlet 233, and can prevent the first outlet 232 and the second outlet 233 from being blocked by foreign matter.

<Structure of Single Housing>

Figure 4A:
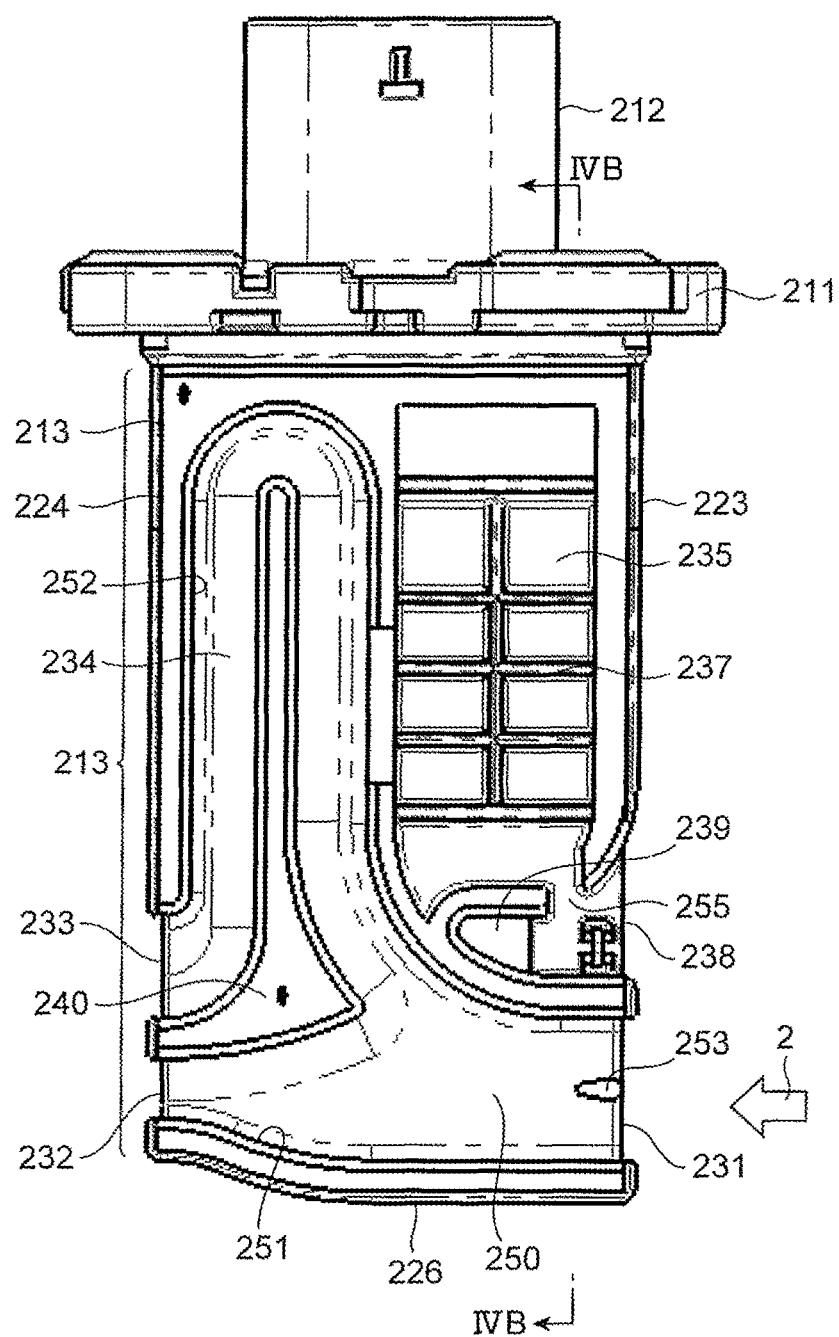
FIG. 4A is a front view of the housing from which a cover assembly has been removed.
Figure 4B:
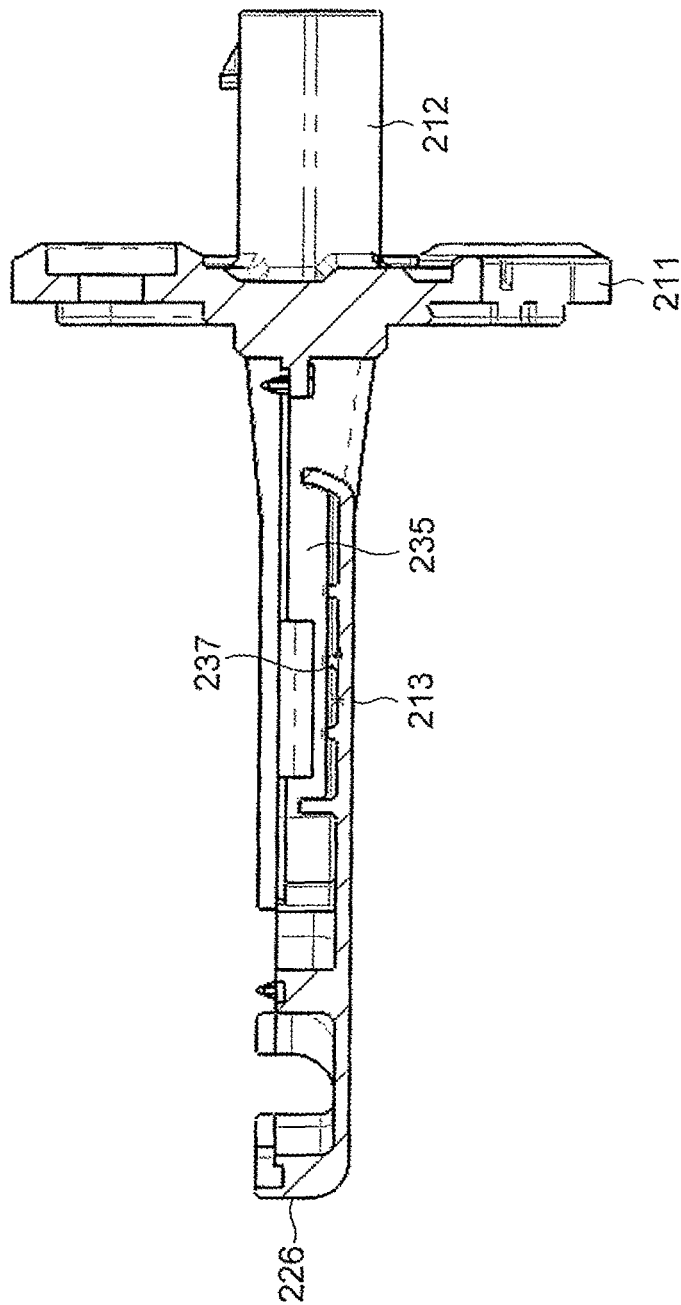
FIG. 4B is a cross-sectional view taken along the line IVB-IVB of FIG. 4A.

FIG. 4A is a front view of the housing from which a cover assembly has been removed, and FIG. 4B is a cross-sectional view taken along the line IVB-IVB of FIG. 4A.

As illustrated in FIG. 4A, the housing 201 is provided with ribs 237 on a bottom surface of the circuit chamber 235. The ribs 237 include a plurality of vertical ribs extending along the longitudinal direction of the measurement unit 213 and a plurality of horizontal ribs extending along the lateral direction of the measurement unit 213, and are provided in a grid pattern.

Since the measurement unit 213 is provided with the ribs 237, the housing 201 can obtain high rigidity without increasing the thickness. The thickness of the housing 201 greatly differs between the flange 211 and the measurement unit 213, a difference in heat shrinkage after injection molding is large, and the measurement unit 213, which is thinner than the flange 211, is easily deformed. Therefore, it is possible to suppress the distortion of the measurement unit 213 at the time of heat shrinkage by providing the grid-shaped ribs 237 that spread in a planar shape on the bottom surface of the circuit chamber 235.

The housing 201 is provided with the ribs 237 not on an outer wall of the measurement unit 213 but on the bottom surface of the circuit chamber 235. In the case of being provided on the outer wall of the measurement unit 213, there is a possibility that the ribs 237 may be affected by the flow of the gas 2 to be measured passing through the main passage 22. In addition, for example, when the depth of the circuit chamber 235 is set on the assumption that the circuit board 207 with one-side mounting is accommodated, the depth of the circuit chamber 235 needs to be increased if the specifications are changed to accommodate the circuit board 207 with double-sided mounting. However, if the ribs are provided on the outer wall of the measurement unit 213, the ribs protrude by an increase in the depth of the circuit chamber 235 so that the thickness of the measurement unit 213 increases. Therefore, the thickness of the measurement unit 213 is different between the one-side mounting and the double-sided mounting, which is likely to affect the detection accuracy.

On the other hand, the ribs 237 are provided on the bottom surface of the circuit chamber 235 in the present embodiment, and thus, it is possible to prevent the influence on the flow of the gas 2 to be measured passing through the main passage 22 and to allow the gas 2 to be measured to flow smoothly. Then, the depth of the bottom surface of the circuit chamber 235 can be changed simply by changing the height of the rib 237 in the circuit chamber 235, and it is unnecessary to change the thickness of the measurement unit regardless of whether the circuit board 207 corresponds to the one-side mounting or the double-sided mounting.

<Structure of Cover Assembly>

Figure 5A:
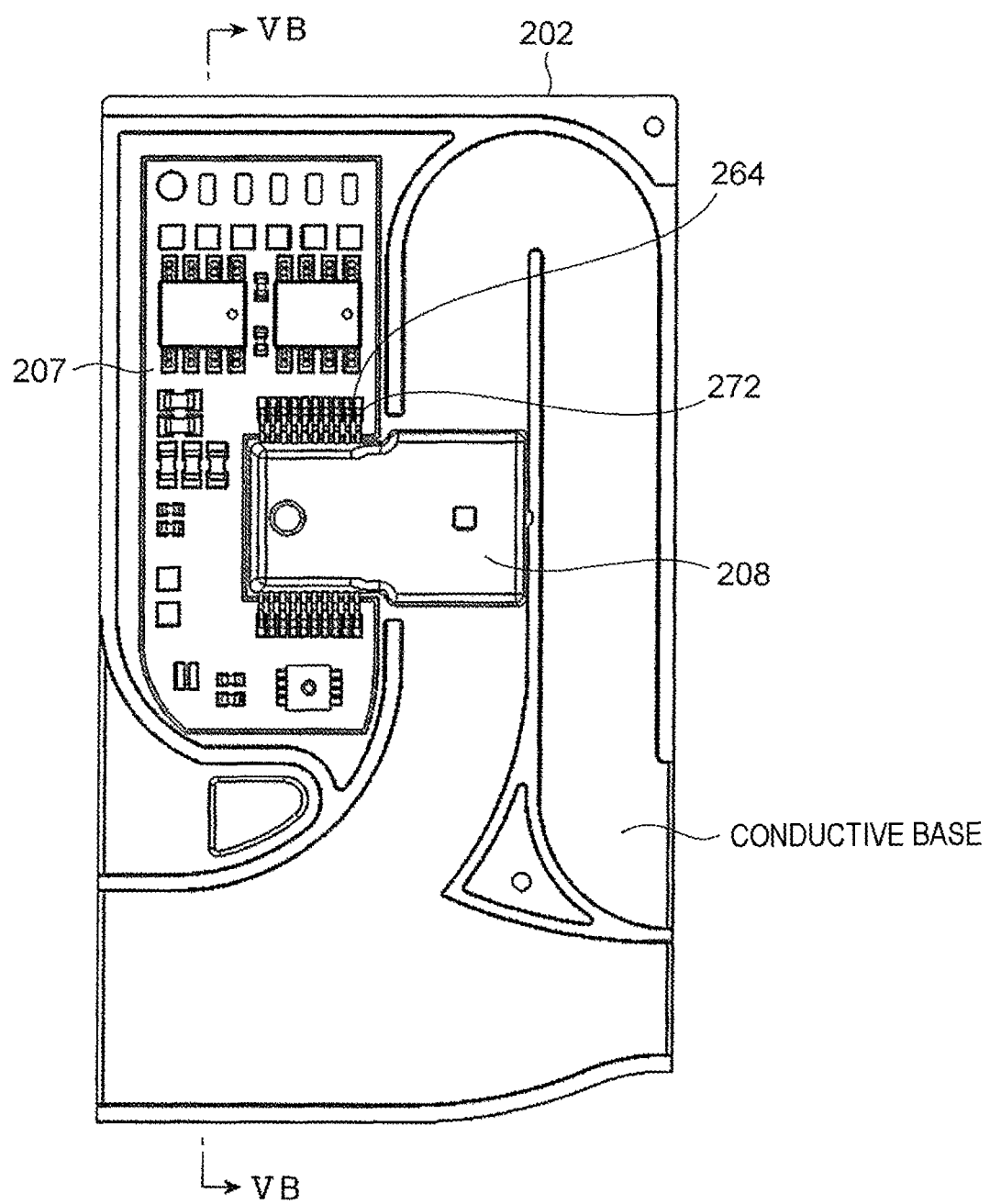
FIG. 5A is a view illustrating a configuration of a cover assembly.
Figure 5B:
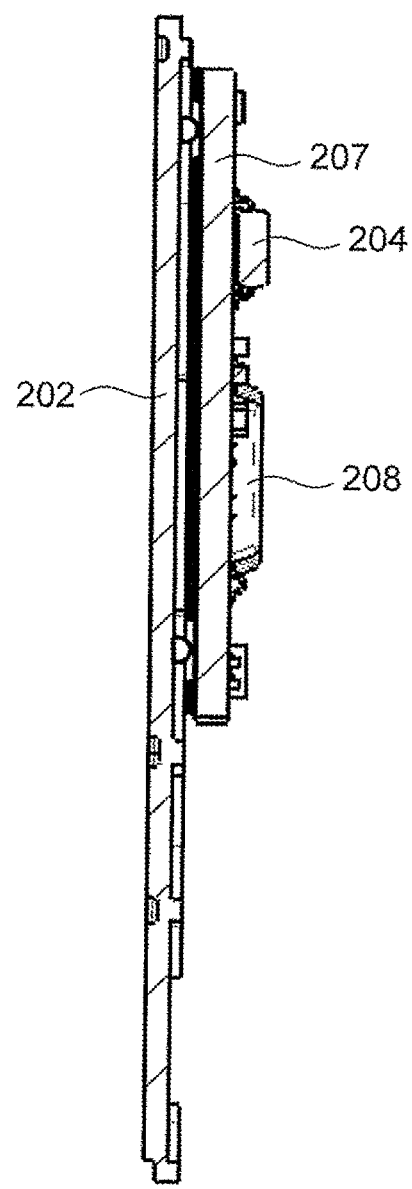
FIG. 5B is a cross-sectional view taken along the line VB-VB of FIG. 5A.

FIG. 5A is a view illustrating a configuration of the cover assembly, and FIG. 5B is a cross-sectional view taken along the line VB-VB of FIG. 5A.

The cover assembly is constituted by the cover 202 and the circuit board 207 on which a chip package 208 is mounted. The cover 202 is formed using a conductive material made of metal such as an aluminum alloy and a stainless alloy. The cover 202 is a flat plate member having a size that covers the front surface of the measurement unit 213, and is fixed to the measurement unit 213 with an adhesive. In addition, the cover 202 covers the circuit chamber 235 of the measurement unit 213, and forms a sub-passage in cooperation with the sub-passage groove 250 of the measurement unit 213. The cover 202 is electrically connected to the ground by interposing a conductive intermediate member between the cover 202 and a predetermined connector terminal 214, and has a static elimination function.

The circuit board 207 on which the chip package 208 is mounted is fixed to aback surface of the cover 202. The circuit board 207 is made of, for example, a printed board, and has a rectangular shape extending along the longitudinal direction of the measurement unit 213. The chip package 208 is fixed to the circuit board 207 at the central position in the longitudinal direction of the circuit board 207 in a state of protruding laterally from an end portion along the lateral direction of the circuit board 207. A package body 271 of the chip package 208 includes: a proximal end portion 271a of which at least a part in the thickness direction is accommodated in the accommodating portion 207a of the circuit board 207; and a distal end portion 271b that protrudes to the lateral side from an end portion of the circuit board 207 along the lateral direction of the circuit board 207.

The cover assembly can accommodate the circuit board 207 in the circuit chamber 235 by attaching the cover 202 to the housing 201, and allow the chip package 208 to extend between the sub-passage 234 and the circuit chamber 235 such that the distal end portion 271b of the package body 271 can be arranged in the sub-passage 234. The flow rate sensor 205 is provided at the distal end portion 271b of the package body 271 and is arranged in the second sub-passage groove 252.

<Sealing Structure in Circuit Chamber>

In the circuit chamber 235, a hatched portion in FIG. 3D is bonded to the cover 202 with an adhesive. As illustrated in FIG. 3A, the front side of the circuit board 207 is hermetically partitioned into three rooms R1, R2, and R3 in the circuit chamber 235. Specifically, the first room R1 to which a connector terminal 214 integrally molded with the housing 201 and a connection terminal of the circuit board 207 are connected, and the second room R2 for accommodation of a pressure sensor 204 and a part of the chip package 208, and a third room R3 in which a temperature and humidity sensor 206 is accommodated and the lead 203b of the intake air temperature sensor 203 is inserted are formed.

The first room R1 is sealed by the cover 202 on the front side, and is open by an opening 227 of the housing 201 on the back side as illustrated in FIG. 2C. However, the opening 227 is filled with a resin material after the connector terminal 214 and the connection terminal of the circuit board 207 are electrically connected by wire bonding. That is, the first room R1 is a hermetically sealed space that is isolated from the outside of the measurement unit 213 by sealing the front side and the back side. Therefore, a connection portion between the connector terminal 214 and the connection terminal can be prevented from coming into contact with a gas contained in the gas 2 to be measured and corroding.

The second room R2 communicates with the sub-passage 234 through a gap between the second room R2 and the cover 202. The pressure sensor 204 is mounted on the circuit board 207 at a position arranged in the second room R2. Therefore, the pressure sensor 204 can measure the pressure in the second room R2. The third room R3 communicates with the outside of the measurement unit 213 at an R3 inlet 255. The temperature and humidity sensor 206 is mounted on the circuit board 207 at a position arranged in the third room R3. Therefore, the temperature and humidity sensor 206 can measure the temperature and humidity in the third room R3. Incidentally, the pressure sensor 204 forms a first sensor that detects pressure, which is a first physical quantity of the gas to be measured, the temperature and humidity sensor 206 forms a second sensor that detects temperature or humidity which is a second physical quantity of the gas to be measured.

<Structure of Circuit Board>

Figure 6B:
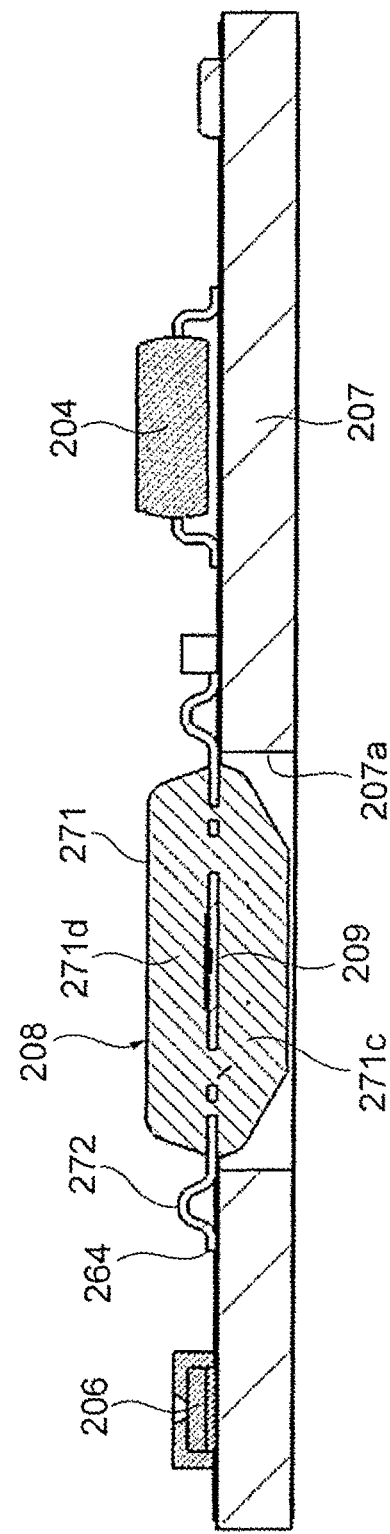
FIG. 6B is a cross-sectional view taken along the line VIB-VIB of FIG. 6A.
Figure 6C:
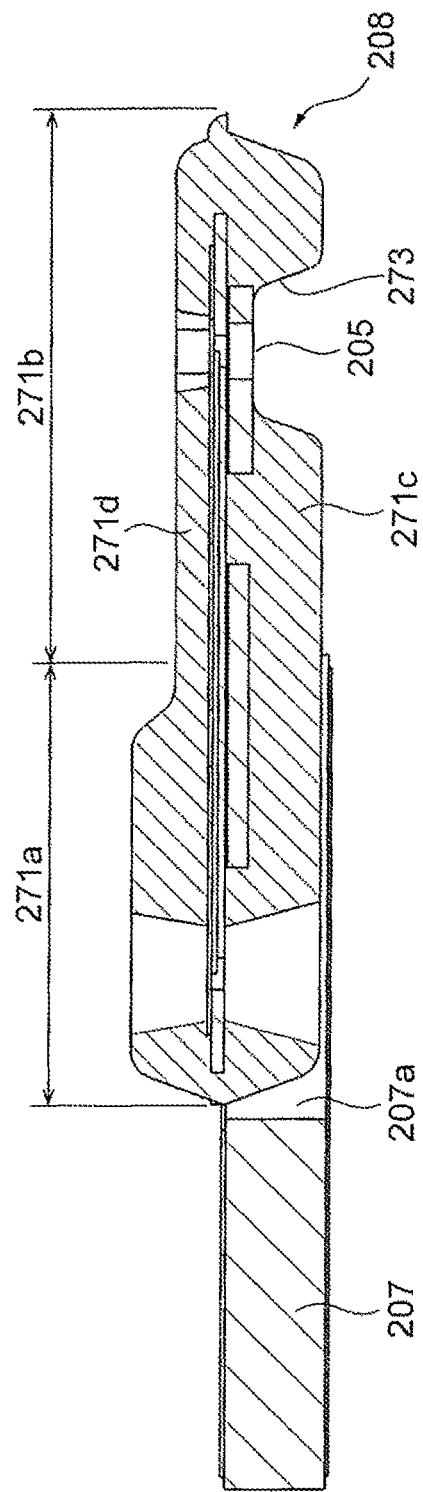
FIG. 6C is a cross-sectional view taken along the line VIC-VIC of FIG. 6A.

FIG. 6A is a front view of the circuit board on which the chip package and circuit components are mounted, FIG. 6B is a cross-sectional view taken along the line VIB-VIB of FIG. 6A, and FIG. 6C is a cross-sectional view taken along the line VIC-VIC of FIG. 6A. Then, 7A is a view illustrating a configuration example of the circuit board.

Figure 7A:
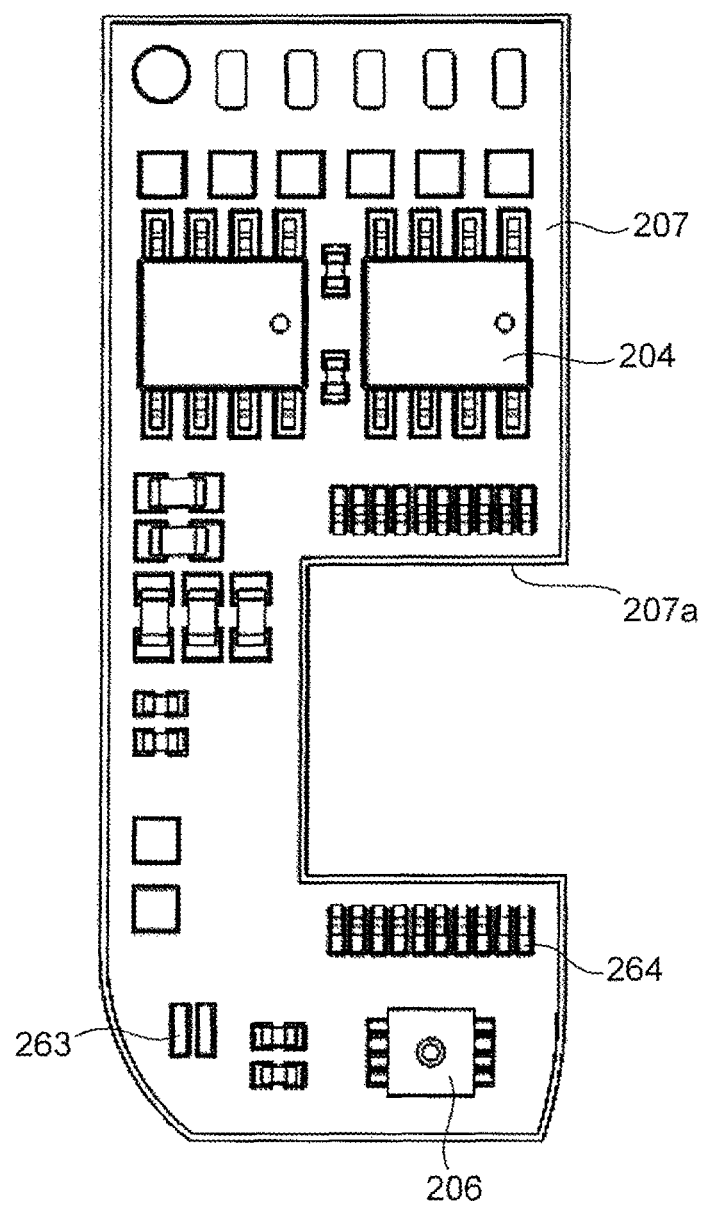
FIG. 7A is a view illustrating a configuration example of a circuit board.

The circuit board 207 has a rectangular shape along the longitudinal direction of the measurement unit 213 as a whole. The circuit board 207 has an accommodating portion 207a configured to accommodate a part of the chip package 208. As illustrated in FIG. 7A, the accommodating portion 207a is formed by partially cutting out a portion of the circuit board 207 that is biased toward the center in the longitudinal direction and one side in the lateral direction (notch portion), and the circuit board 207 has a substantially U-shape in a plan view.

As illustrated in FIGS. 6A, 6B, and 6C, in the chip package 208, at least a part of a package body 271 in the thickness direction enters the accommodating portion 207a of the circuit board 207 to be accommodated therein. Specifically, the package body 271 is accommodated in a state where a package front surface portion 271c, which is a proximal end portion 271a of the package body 271 and a portion of the package body 271 on which the flow rate sensor 205 is provided, enters the accommodating portion 207a of the circuit board 207.

Since the package front surface portion 271c, which is a part of the package body 271 in the thickness direction, is accommodated in the accommodating portion 207a of the circuit board 207 in the present embodiment, the overall mounting height including the thickness of the chip package 208 and the height of the terminal can be suppressed. As a result, for example, the mounting height can be reduced to the same as that of the small pressure sensor mounted on the circuit board 207 together with the chip package 208. In addition, the mounting height of the mounting components can be suppressed to be lower as compared with a case where the chip package 208 is mounted on the circuit board 207 in an overlapping manner. Therefore, the height of the measurement unit 213 can be reduced, the physical quantity detecting device 20 can be made thin as illustrated in FIG. 3B, and the flow resistance in the main passage can be reduced. Incidentally, the case where the package front surface portion 271c of the package body 271 is accommodated in the accommodating portion 207a of the circuit board 207 has been described as an example in the present embodiment, but it may be configured such that the entire package body 271 in the thickness direction is accommodated. With such a configuration, it is possible to further promote the height reduction of the measurement unit 213 and to reduce the thickness of the physical quantity detecting device 20.

<Arrangement Position of Each Sensor>

As illustrated in FIG. 6A, the chip package 208, the pressure sensor 204, and the temperature and humidity sensor 206 are mounted on the circuit board 207. The chip package 208 is provided with a plurality of connection terminals 272 protruding from the proximal end portion 271a of the package body 271, and is fixed to the circuit board 207 as these connection terminals 272 are connected to pads 264 of the circuit board 207 by soldering. The flow rate sensor 205 and an LSI, which is an electronic component that drives the flow rate sensor 205, are mounted on the chip package 208. The flow rate sensor 205 is provided at a distal end portion 271b of the package body 271. The chip package 208 forms a support body on which the flow rate sensor 205 as a flow rate detection unit and an LSI as a processing unit are mounted.

In the configuration example illustrated in FIGS. 6A to 6C, the chip package 208 is attached to the circuit board 207 such that the package front surface portion 271c, which is one side in the thickness direction of the chip package 208, is located on the back surface side of the circuit board 207, that is, on the surface facing the cover 202. Therefore, the flow rate sensor 205 can be arranged so as to oppose the cover 202, which is a conductive member, and static elimination can be performed on the flow rate sensor 205 and the periphery thereof. With this static elimination, the flow rate sensor 205 and the periphery thereof can be prevented from becoming charged, the accumulation of dust due to an adsorption force of the charge can be suppressed, and the high detection accuracy can be obtained.

Figure 6D:
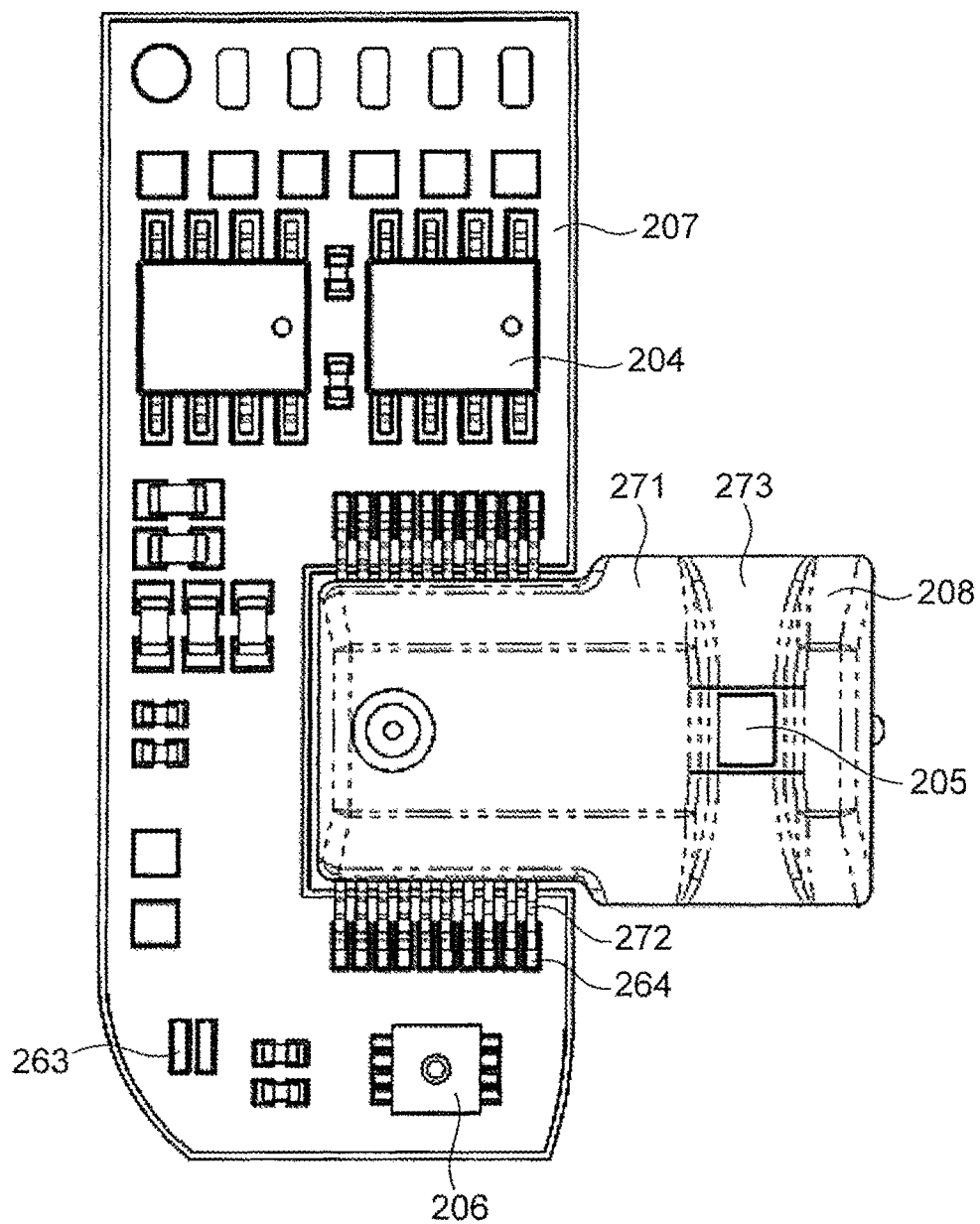
FIG. 6D is a view illustrating another configuration example of the circuit board.

Incidentally, the chip package 208 may be attached to the circuit board 207 such that the package front surface portion 271c provided with the flow rate sensor 205 is located on the front surface side of the circuit board 207, that is, on a surface side away from the cover 202 as illustrated in FIG. 6D. In the chip package 208, the flow rate sensor 205 may be exposed on either the front surface side or the back surface side of the circuit board 207. Even in such a configuration, a part of the chip package 208 in the thickness direction can be accommodated in the accommodating portion 207a of the circuit board 207 to suppress the overall mounting height, the height can be lowered, and the physical quantity detecting device 20 can be made thinner. In addition, the distance from a mounting surface of the circuit board 207 can be secured, and the mounting height of the chip package 208 with respect to the circuit board 207 can be controlled, and a shape of the connection terminal to be described later can be secured.

The pressure sensor 204 is mounted to be closer to one side of the circuit board 207 in the longitudinal direction than the chip package 208, and the temperature and humidity sensor 206 is mounted to be closer to the other side of the circuit board 207 in the longitudinal direction than the chip package 208. Then, the lead of the intake air temperature sensor 203 is connected to the circuit board 207. The intake air temperature sensor 203 is mounted to be arranged at a position where the lead 203b is connected to a position closer to the other side of the circuit board 207 in the longitudinal direction than the temperature and humidity sensor 206, and the sensor body 203a protrudes from the circuit board 207 in the longitudinal direction to be exposed to the outside of the measurement unit 213.

On the measurement unit 213, (1) the pressure sensor 204, (2) the flow rate sensor 205, (3) the temperature and humidity sensor 206, and (4) the intake air temperature sensor 203 are arranged in this order along the longitudinal direction from the proximal end portion side to the distal end portion side (in a protruding direction of the measurement unit 213). (1) The pressure sensor 204 detects the pressure of the gas 2 to be measured, and the flow rate sensor 205 detects the flow rate of the gas 2 to be measured. The temperature and humidity sensor 206 detects the humidity of the gas 2 to be measured, and the intake air temperature sensor detects the temperature of the gas to be measured.

The physical quantity detecting device 20 is arranged, for example, in an engine room of an automobile. The temperature in the engine room is 60° C. to 100° C., and the temperature of the gas 2 to be measured passing through the main passage 22 is 25° C. on average. Therefore, heat in the engine room is transferred to the physical quantity detecting device 20 from the flange 211 side, and a temperature distribution thereof is given such that the temperature gradually decreases as shifting from the flange 211 side toward the distal end portion side of the measurement unit 213.

Therefore, in the measurement unit 213 of the present embodiment, (1) the pressure sensor 204, which has the smallest thermal effect, is arranged on the proximal end side, and then, (2) the flow rate sensor 205, which has a small thermal effect on the high temperature side, is arranged closer to the distal end portion side of the measurement unit 213 than (1) the pressure sensor 204. Then, (3) the temperature and humidity sensor 206, which has a small thermal effect on the low temperature side, is arranged to be closer to the distal end portion side of the measurement unit 213 than (2) the flow rate sensor 205 next, and (4) the intake air temperature sensor 203, which is most susceptible to heat, is arranged at the distal end portion of the measurement unit 213.

Since the circuit board 207 is arranged so as to extend along the longitudinal direction of the measurement unit 213 according to the present embodiment, a heat conduction distance from the flange 211 can be secured up to the vicinity of the central axis of the main passage 22. Since the respective sensors (1) to (4) are arranged side by side from the proximal end portion to the distal end portion of the measurement unit 213 in ascending order of the thermal effect, the sensor performance of each sensor can be ensured. In addition, the thermal conductivity to air can be promoted by arranging the circuit board 207 on one side in the lateral direction of the measurement unit 213.

In addition, the intake air temperature sensor 203 is connected to the circuit board 207. As illustrated in FIG. 6A, the intake air temperature sensor 203 is arranged so as to protrude from a distal end portion of the circuit board 207 along the longitudinal direction. The pair of leads 203b of the intake air temperature sensor 203 are bent along the surface of the circuit board 207 and protrude from the distal end portion of the circuit board 207. Solder pads 263 are provided on a board surface of the circuit board 207 facing the pair of leads 203b, and the leads 203b are soldered. The sensor body 203a is supported by the pair of leads 203b at a position separated from the circuit board 207 by a predetermined distance.

According to the present embodiment, the center of the circuit board 207 in the longitudinal direction is cut out to form the accommodating portion 207a, and the proximal end portion 208a of the chip package 208 is accommodated therein. Then, the proximal end portion 208a of the chip package 208 is provided with the plurality of connection terminals 272 that protrude in the directions away from each other along the lateral direction of the package body 271. In the chip package 208, the distal end portion 271b including the flow rate sensor 205 protrudes in a direction orthogonal to a passage direction of the sub-passage, and the plurality of connection terminals 272 are arranged to be divided into one side and the other side in the passage direction of the sub-passage.

In the circuit board 207, the plurality of pads 264 are provided to be divided into one side and the other side in the longitudinal direction of the circuit board 207, which is a portion to which the pads 264 opposes with the accommodating portion 207a therebetween, and the respective pads 264 are fixed by soldering. The chip package 208 has a stably supported structure in which both ends in the lateral direction of the proximal end portion 271a of the package body 271 are supported by the circuit board 207.

In addition, in the present embodiment, the chip package 208 is arranged such that the longitudinal direction of the package body 271 is orthogonal to the extending direction of the second sub-passage groove 252, and the plurality of connection terminals 272 divided into two sides at predetermined intervals in the extending direction of the second sub-passage groove 252 are joined to the pads 264 of the circuit board 207. Therefore, the chip package 208 can be attached at a correct position with respect to the circuit board 207 when being attached to the circuit board 207, and a structure is formed in which the second sub-passage groove 252 and the passage groove 273 of the package body 271 can be easily parallelized.

According to the present embodiment, the chip package 208 is arranged at an intermediate position between the pressure sensor 204 and the temperature and humidity sensor 206, and exchanges signals between these sensors. Therefore, it is possible to shorten a signal transmission path between the chip package 208 and each sensor, to improve the signal transmission speed, and to suppress generation of noise.

Figure 7B:
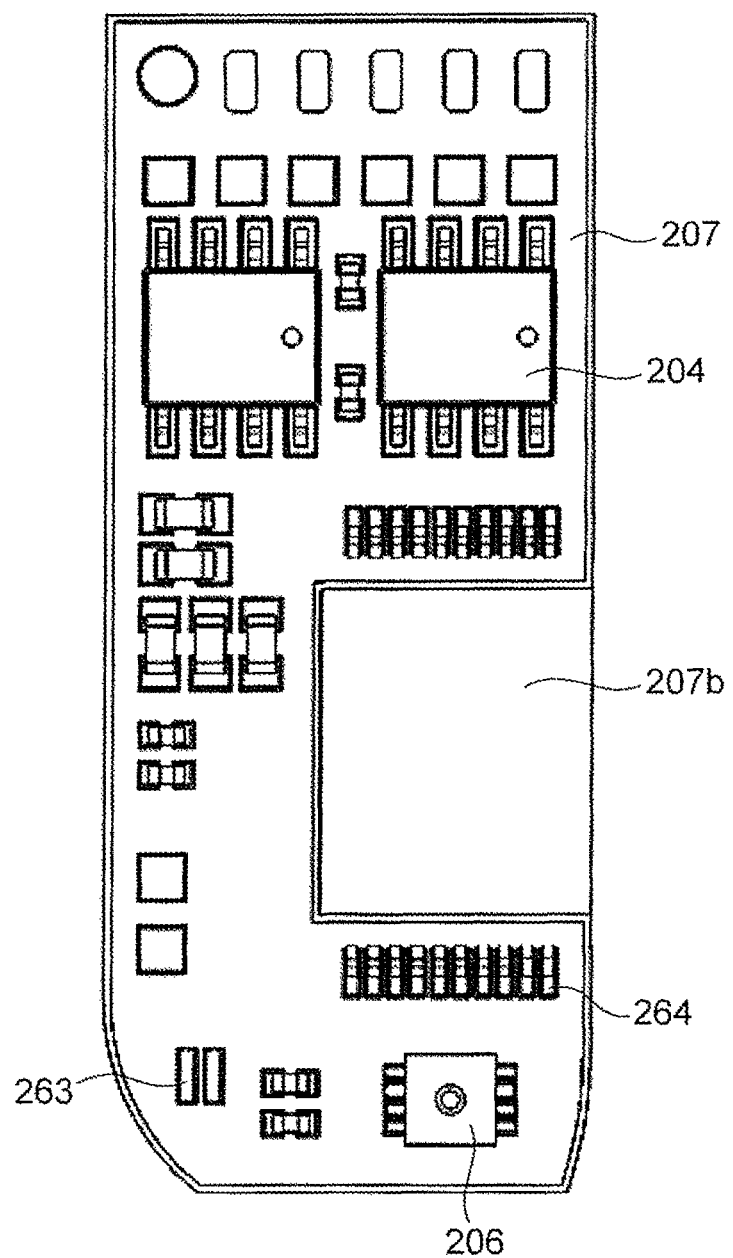
FIG. 7B is a view illustrating another configuration example of the circuit board.
Figure 7C:
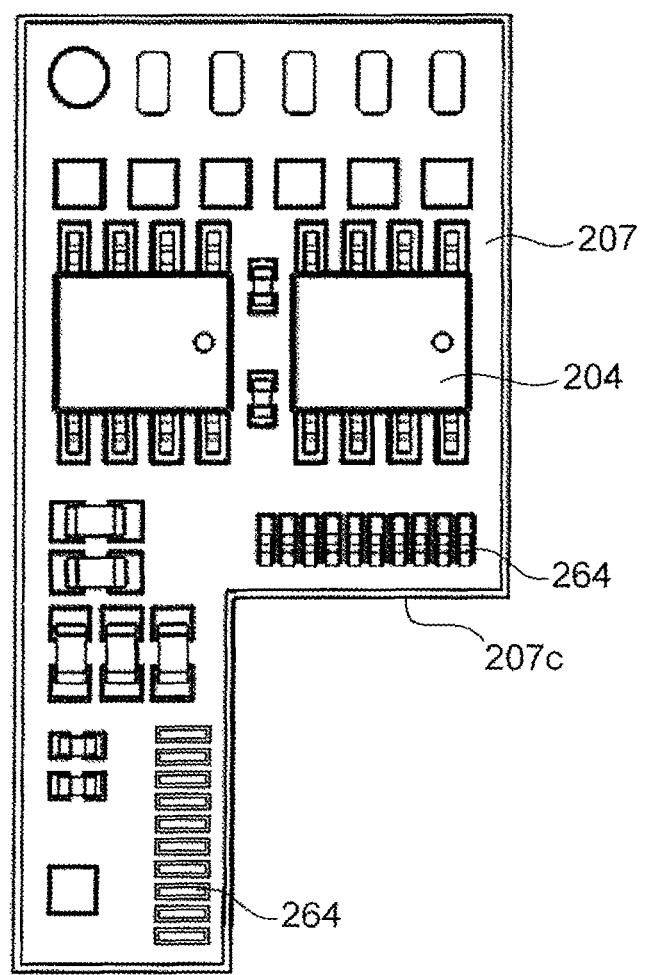
FIG. 7C is a view illustrating still another configuration example of the circuit board.

FIGS. 7B and 7C are views illustrating another configuration example of the circuit board.

Although the case where the accommodating portion 207a of the circuit board 207 is formed using a notch has been described as an example in the above-described embodiment, the accommodating portion is preferably capable of accommodating a part of the chip package 208 in the circuit board 207, and may be formed using a groove or a counterbore.

For example, as illustrated in FIG. 7B, a recessed portion may be provided on the front surface of the circuit board 207 to form an accommodating portion 207b. The accommodating portion 207b is continuous to a side surface of the circuit board 207 along a direction in which the distal end portion 271b of the package body 271 of the chip package 208 protrudes. The thickness of the circuit board 207 is thin in the accommodating portion 207b to allow insertion of at least a part of the chip package 208 in the thickness direction. Therefore, as compared with the case where the chip package 208 is mounted on the circuit board 207 in an overlapping manner, the mounting height of the mounting components can be suppressed to be low, and the overall thickness of the measurement unit 213 can be reduced, which is similar to the above-described accommodating portion 207a. As a result, the physical quantity detecting device 20 can be made thin, and the flow resistance in the main passage can be reduced.

In addition, the case where the accommodating portion 207a of the circuit board 207 is provided at the center of the circuit board 207 in the longitudinal direction has been described in the above-described embodiment, but the accommodating portion 207a may be provided at another place. For example, as illustrated in FIG. 7C, an end portion of the circuit board 207 on the one side in the longitudinal direction may be cut out such that the overall shape of the circuit board 207 has a substantially L-shape, and a notched portion is used as an accommodating portion 207c.

The accommodating portion 207c allows insertion of the proximal end portion 271a of the package body 271. Therefore, as compared with the case where the chip package 208 is mounted on the front surface of the circuit board 207 in an overlapping manner, the mounting height of the mounting components can be suppressed to be low, and the overall thickness of the measurement unit 213 can be reduced, which is similar to the above-described accommodating portion 207a. As a result, the physical quantity detecting device 20 can be made thin, and the flow resistance in the main passage can be reduced.

<Configuration of Chip Package 208>

Figure 8A:
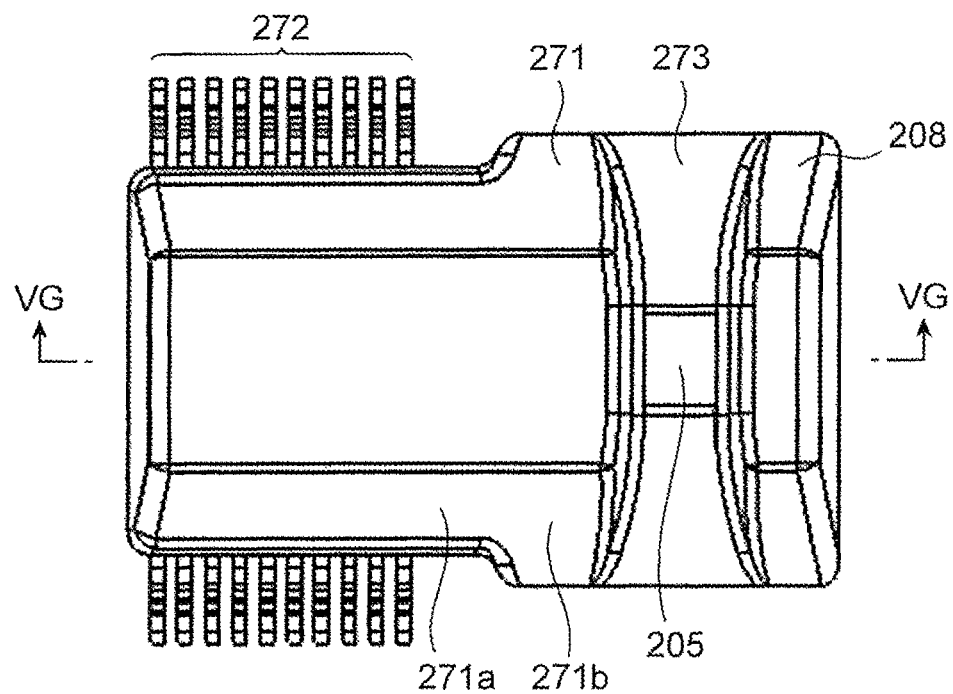
FIG. 8A is a front view of the chip package.
Figure 8B:
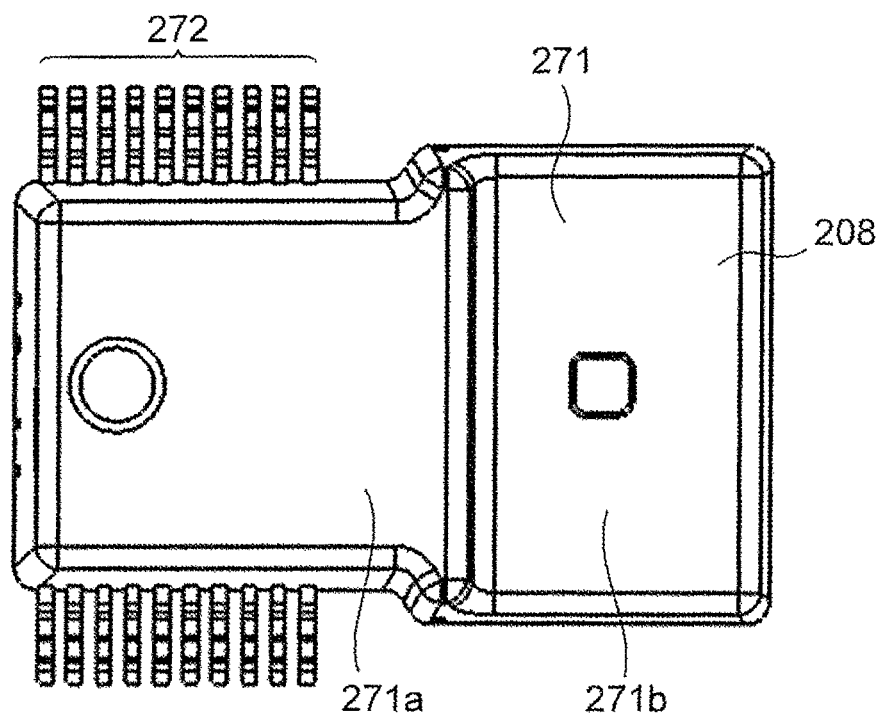
FIG. 8B is a back view of the chip package.
Figure 8C:
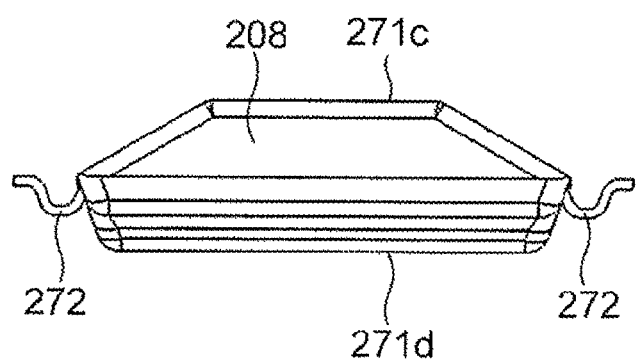
FIG. 8C is a side view of the chip package.
Figure 8D:
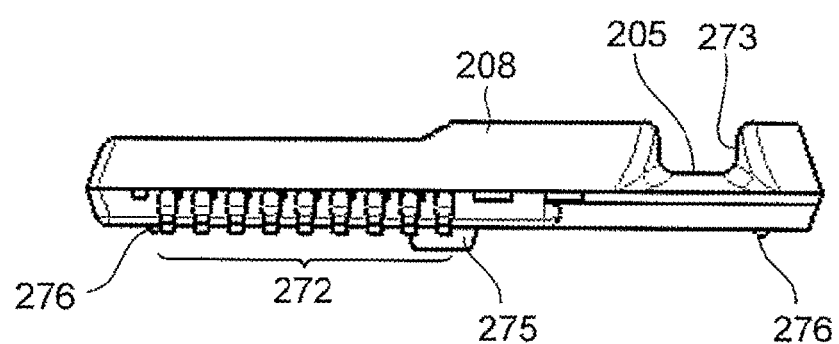
FIG. 8D is a bottom view of the chip package.
Figure 8E:
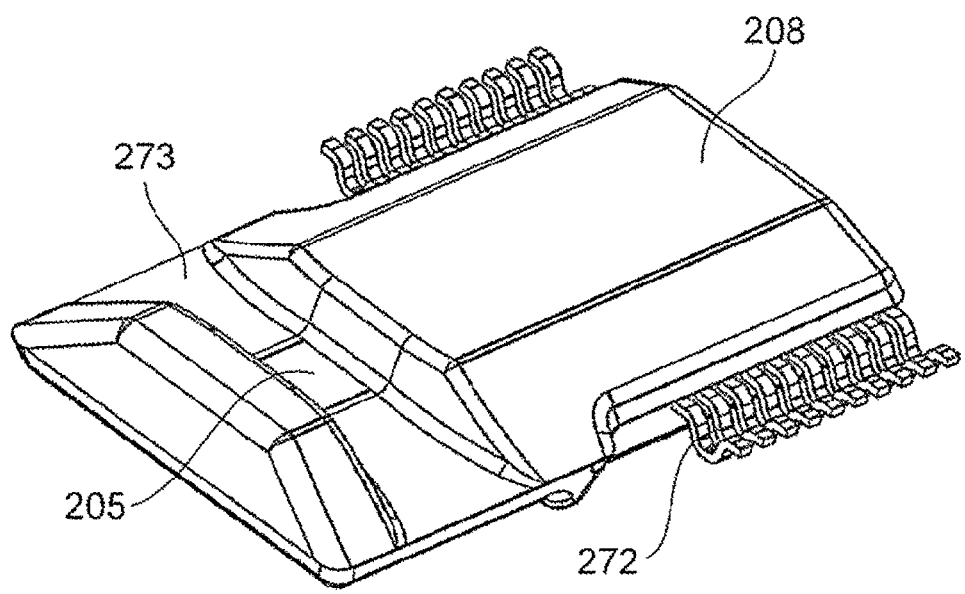
FIG. 8E is an isometric view of the chip package.

FIG. 8A is a front view of the chip package, FIG. 8B is a back view of the chip package, FIG. 8C is a side view of the chip package, FIG. 8D is a bottom view of the chip package, and FIG. 8E is an isometric view of the chip package.

The chip package 208 is configured by mounting the LSI and the flow rate sensor 205 on a lead frame and sealing the resultant with thermosetting resin. The chip package 208 has the package body 271 that is resin-molded into a substantially flat plate shape. The package body 271 has a rectangular shape, and extends along the lateral direction of the measurement unit 213 such that the proximal end portion 271a on one side in the longitudinal direction of the package body 271 is arranged in the circuit chamber 235 and the distal end portion 271b on the other side in the longitudinal direction of the package body 271 is arranged in the second sub-passage groove 252.

The chip package 208 is electrically conducted and integrally fixed to the circuit board 207 by soldering the plurality of connection terminals 272 provided at the proximal end portion 271a of the package body 271 to the pads 264 of the circuit board 207. The flow rate sensor 205 is provided at a distal end portion 271b of the package body 271. The flow rate sensor 205 is arranged so as to be exposed in the second sub-passage. The flow rate sensor 205 is provided in the passage groove 273 provided to be recessed on the surface of the package body 271. The passage groove 273 is formed over the entire width from an end portion on one side in the lateral direction to an end portion on the other side in the lateral direction of the package body 271 so as to extend along the second sub-passage groove 252 in the second sub-passage groove 252. The flow rate sensor 205 has a diaphragm structure. When the chip package 208 is molded with resin, resin molding is performed by applying an insertion die such that the resin does not flow into the surface of the flow rate sensor 205.

Figure 10:
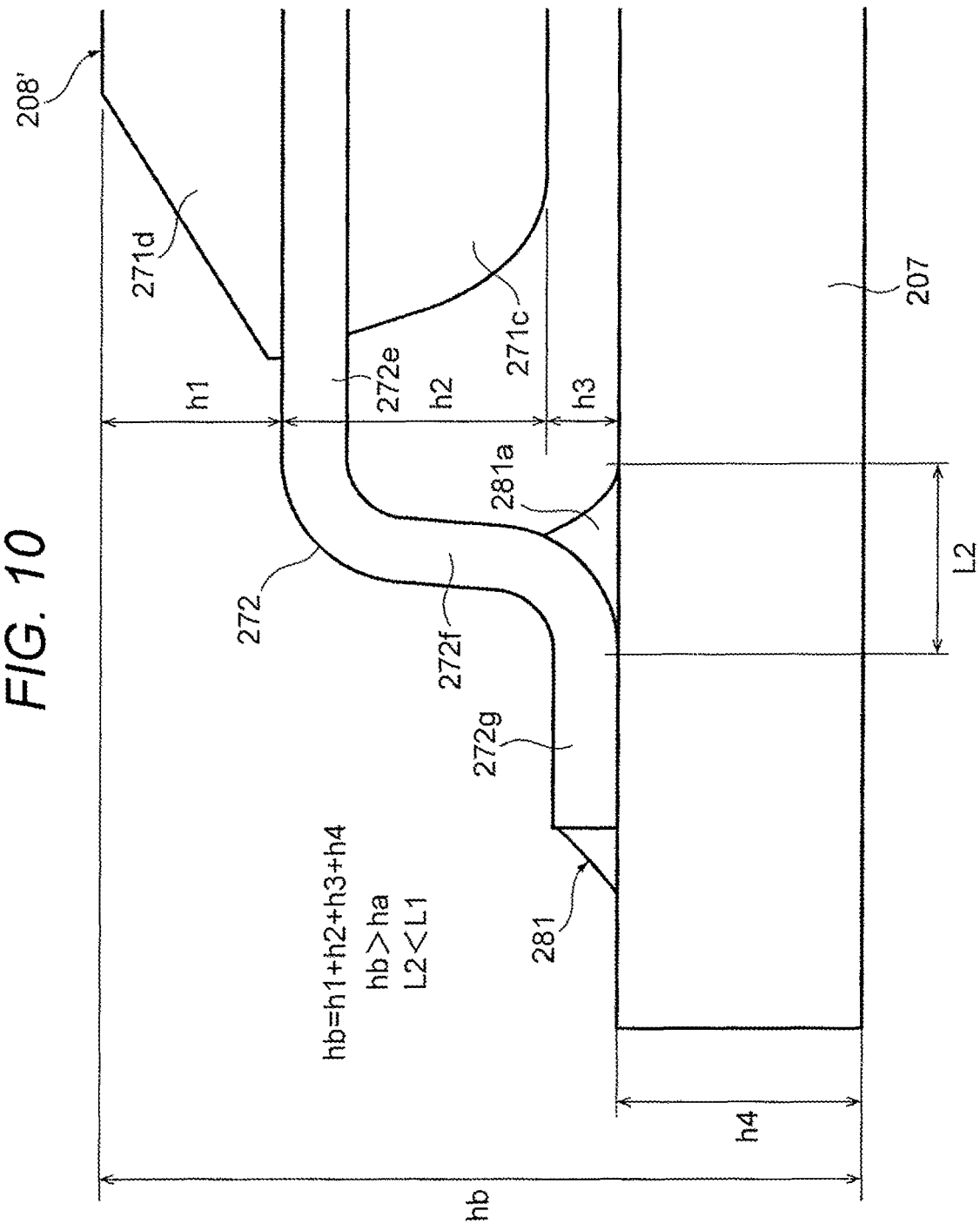
FIG. 10 is a view illustrating a bent shape of a connection terminal according to a comparative example.

FIG. 9 is a view illustrating a bent shape of the connection terminal according to the present embodiment, and FIG. 10 is a view illustrating a bent shape of a connection terminal according to a comparative example.

As illustrated in FIG. 9, the connection terminal 272 of the chip package 208 includes: a protruding portion 272a which is a proximal end portion, a rising portion 272b, a falling portion 272c, and an end portion 272d which is a distal end portion. The protruding portion 272a protrudes straight from the center of the package body 271 in the thickness direction along the lateral direction of the package body 271, and the rising portion 272b has a shape that rises from a distal end of the protruding portion 272a by being bent toward a package back surface portion 271d which is one side in the thickness direction of the package body 271. Then, the falling portion 272c has a shape that is continuous with the rising portion 272b and falls to be bent toward the package front surface portion 271c, which is the other side in the thickness direction of the package body 271 at a first bending height position, and the end portion 272d has a shape that is continuous with the falling portion 272c and protrudes in a direction away from the package body 271 at a second bending height position.

The protruding portion 272a and the end portion 272d are located at different positions of the package body 271 in the thickness direction, and the end portion 272d is formed so as to be higher by δ than the protruding portion 272a on the package back surface portion 271d side, which is one side in the thickness direction of the package body 271. Then, when the proximal end portion 271a of the package body 271 is accommodated in the accommodating portion 207c of the circuit board 207, the protruding portion 272a, which is the base of the connection terminal 272, is placed to abut on an upper surface of the circuit board 207 and the end portion 272d is arranged at a position facing the pad 264 on the upper surface of the circuit board 207 with the gap δ. That is, a state is formed in which the protruding portion 272a abuts on the top of the circuit board 207, and the end portion 272d floats from the circuit board 207.

The rising portion 272b and the falling portion 272c are formed to have gentle slopes such that a falling angle θa2 of the falling portion 272c is set to be larger than a rising angle θa1 of the rising portion 272b, the falling portion 272c is tilted more than the rising portion 272b with respect to the circuit board 207, and a slope of the falling portion 272c is gentler. In the present embodiment, a solder 281 is used as a joining member to join the end portion 272d and the pad 264 of the circuit board 207, and a so-called solder back fillet 281a in which the solder 281 protrudes in a direction returning from the end portion 272d to the protruding portion 272a along the axial direction of the connection terminal 272 is formed between the connection terminal 272 and the circuit board 207.

A chip package 208' of the comparative example illustrated in FIG. 10 is arranged on the circuit board 207, and the connection terminals 272 thereof include a protruding portion 272e, a falling portion 272f, and an end portion 272g. The protruding portion 272e has a shape that protrudes from the center of the package body 271 in the thickness direction along the lateral direction of the package body 271, and the falling portion 272f has a shape that falls to be bent from a distal end of the protruding portion 272e to the package back surface portion 271d side. Then, the end portion 272g has a shape that is bent at a lower end of the falling portion 272f in a direction away from the package body 271 and protrudes along the lateral direction of the package body 271. The falling portion 272f is formed so as to have an angle substantially perpendicular to the upper surface of the circuit board 207.

When the chip package 208' of comparative example is mounted on the circuit board 207, a total thickness hb is a value obtained by adding all of a thickness h1 of the package back surface portion 271d of the package body 271, a thickness h2 of the package front surface portion 271c, a gap h3 with respect to the circuit board 207, and a thickness h4 of the circuit board 207 (hb=h1+h2+h3+h4). Since the chip package 208' of the comparative example is mounted on the circuit board 207, the overall mounting height becomes high. In addition, it is considered that the equivalent strain of the solder is largely affected by a change of a vertical strain in the Z direction, and a structure having a large mounting height is not desirable in terms of the life of the solder.

On the other hand, in the present embodiment, a total thickness ha when the chip package 208 of the present embodiment is mounted on the circuit board 207 is a value obtained by adding the thickness h2 of the package back surface portion 271d and the thickness h1 of the circuit board 207 (ha=h2+h1). Therefore, the present embodiment can achieve height reduction as compared with the comparative example. Incidentally, the thickness of the circuit board 207 can be made equal to the thickness h1 of the package back surface portion 271d of the package body 271 in the present embodiment.

In addition, according to the present embodiment, the falling portion 272c of the connection terminal 272 is gently tilted with respect to the circuit board 207, and thus, a length L1 of the solder back fillet 281a can be increased as compared with the falling portion 272f which is substantially perpendicular to the circuit board 207 of the comparative example (L2<L1). Therefore, the solder strain can be reduced and the life of the solder can be extended. In addition, the rising portion 272b of the connection terminal 272 has a smaller tilt angle than the falling portion 272c, and thus, the overall protrusion amount of the connection terminal 272 can be shortened, and the chip package 208 can be downsized.

In the comparative example, the end portion 272g provided at the folded distal end of the connection terminal 272 is placed on the pad of the circuit board 207 and soldered. Thus, positioning of the chip package 208 with respect to the circuit board 207 is difficult, and there is a problem that the terminal height varies greatly, which affects the position accuracy of the flow rate sensor 205. On the other hand, in the present embodiment, a part of the chip package 208 is accommodated in the accommodating portion 207a, and the protruding portion 272a, which is the base of the connection terminal 272, is placed on the circuit board 207, thereby positioning the chip package 208. Therefore, it is easier to position the chip package 208 with respect to the circuit board 207 as compared with the comparative example, and there is an advantage that the accuracy of the position of the flow rate sensor 205 is high.

Figure 11:
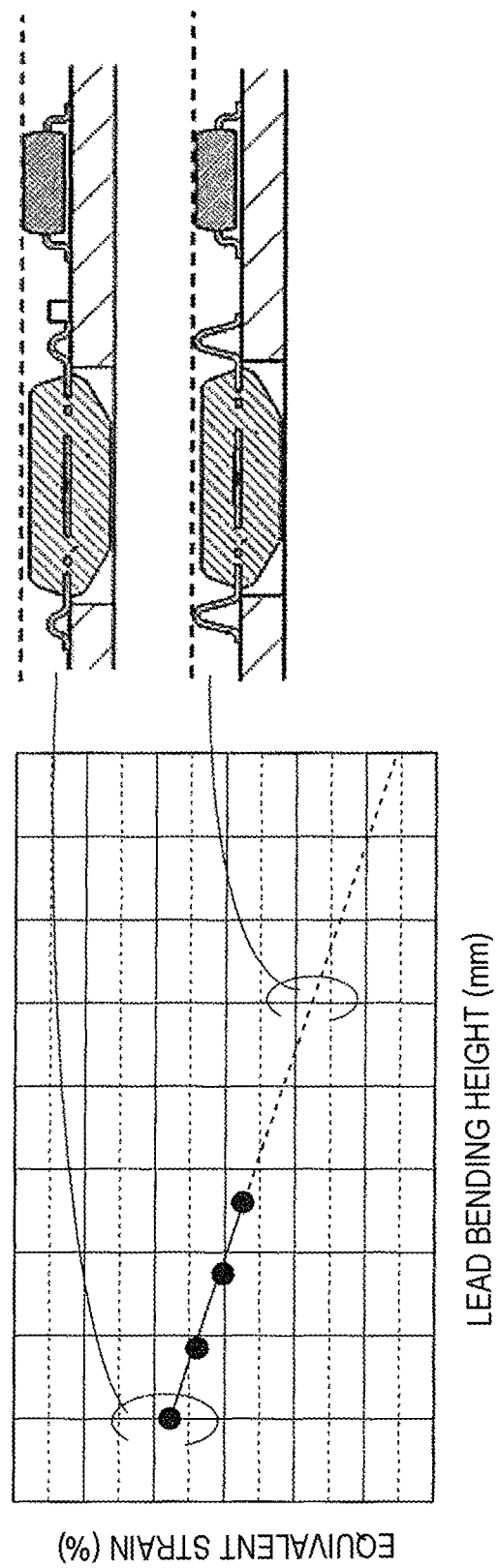
FIG. 11 is a view illustrating the relationship between the bending height of a connection terminal and an equivalent strain.

FIG. 11 is a graph illustrating the relationship between the bending height of the connection terminal and an equivalent strain, and is the graph illustrating prediction of the life of the terminal connection in a temperature change. According to the present embodiment, a sufficient life can be secured even if the terminal height of the connection terminal 272 of the chip package 208 is lower than that of the chip package 208. In addition, the terminal height of the connection terminal 272 can be raised to the surface height position of the adjacent pressure sensor 204, and thus, there is no limitation on the formability of the connection terminal 272 even when the height is lowered as in the present embodiment, and the reliability of the mechanical connection of the chip package 208 can be further improved.

Incidentally, the case where the solder is used as the joining member that joins the pad 264 of the circuit board 207 and the connection terminal 272 has been described in the above embodiment, the present invention is not limited thereto, and for example, a welding alloy or a conductive adhesive may be used.

Figure 12:
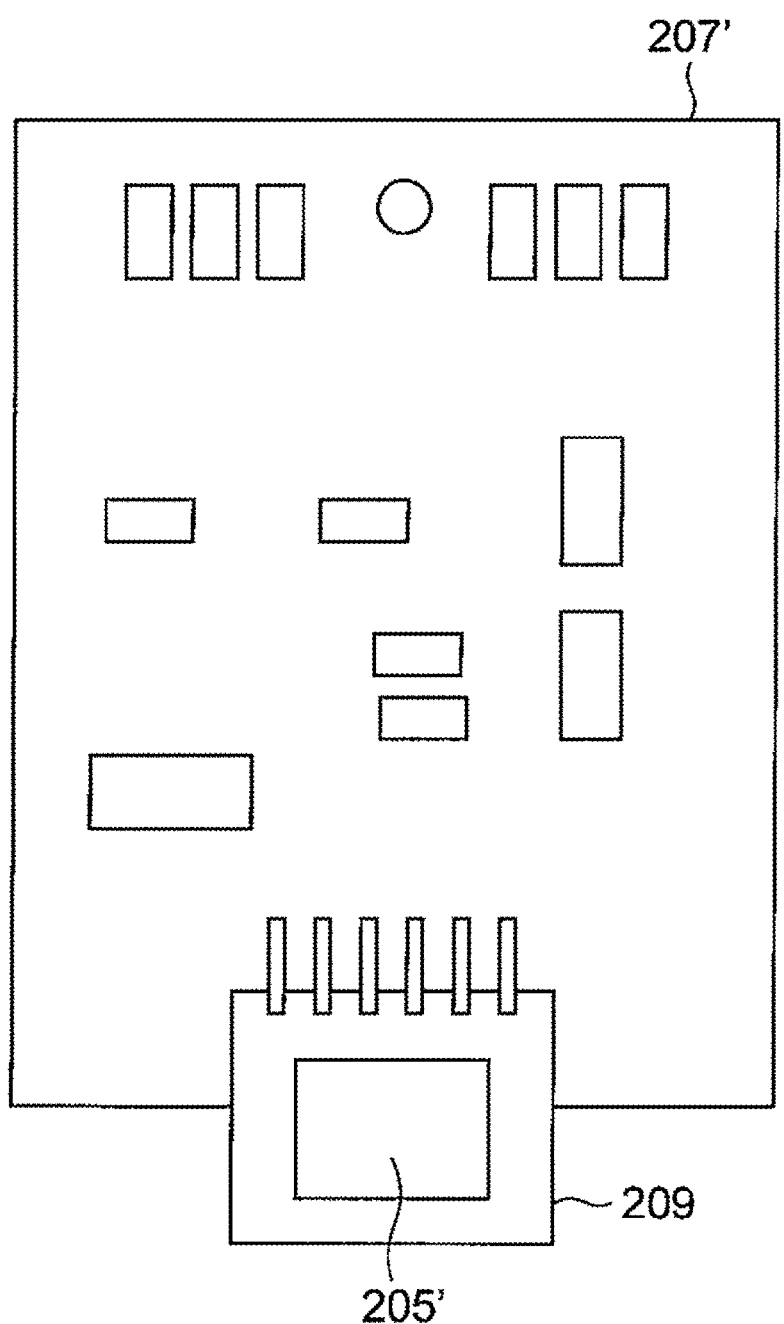
FIG. 12 is a view illustrating a configuration in which a sensor is directly attached to a circuit board.

FIG. 12 is a view illustrating a configuration in which a sensor is directly attached to a circuit board, and is a plan view illustrating a modification of the circuit board 207 illustrated in FIG. 6A.

Measuring element including a flow rate measuring unit 205' may be mounted on a circuit board 207' via a support body 209 attached to the circuit board 207' which is a printed board. With this configuration, stress acting on the measuring elements can be reduced as compared with a case where components, such as the measuring elements including the flow rate measurement unit 205', are directly mounted on the circuit board 207, and the durability and reliability of the physical quantity detecting device 20 can be improved.

Incidentally, to mount the components on the circuit board 207 includes, for example, to attach the components to the circuit board 207, and to electrically connect the components to a wiring of the circuit board 207. Examples of the support body 209 include a metal lead frame, an LTCC board, a printed board, and the like on which an electric wiring can be formed. A hole or a protrusion for positioning with respect to the housing 201 may be formed on the support body 209, and a configuration in which positioning is performed using the positioning protrusion or hole formed in the housing 201 may be adopted.

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. In addition, configurations of another embodiment can be substituted for some configurations of a certain embodiment, and further, a configuration of another embodiment can be added to a configuration of a certain embodiment. Further, addition, deletion, or substitution of other configurations can be made with respect to some configurations of each embodiment.

REFERENCE SIGNS LIST 1 internal combustion engine control system
2 measurement gas
20 physical quantity detecting device
22 main passage
201 housing
202 cover
203 intake air temperature sensor
204 pressure sensor
205 flow rate sensor
206 temperature and humidity sensor
207 circuit board
208 chip package
211 flange
212 connector
213 measurement unit
214 connector terminal
221 front surface
222 back surface
223 side surface on one side
224 side surface on other side
226 lower surface
231 sub-passage inlet
232 first outlet
233 second outlet
234 sub-passage
235 circuit chamber
237 rib (bottom surface of circuit chamber)
240 ventilation passage
241 fixing hole
242 through-hole
243 first rib
244 second rib
245 third rib
246 fourth rib
247 external terminal
248 correction terminal
249 ventilation hole (ventilation passage outlet)
250 sub-passage groove
251 first sub-passage groove
252 second sub-passage groove
253 protrusion
254 ventilation hole (ventilation passage inlet)
255 R3 inlet
256 ventilation groove
263 pad (for intake air temperature sensor)
264 pad (for chip package terminal)
265 positioning hole
271 package body
272 connection terminal
273 passage groove

The invention claimed is:

1. A physical quantity detecting device comprising:
a support body on which a flow rate detector and a processor are mounted; and
a circuit board having an accommodating portion in which a part of the support body is accommodated,
wherein,
in the support body, at least a part in a thickness direction of the support body is accommodated in the accommodating portion, and a part including the flow rate detector protrudes from the accommodating portion,
the accommodating portion is formed by cutting out a part of the circuit board,
the support body is fixed to places facing each other with the accommodating portion of the circuit board interposed between the places,
the support body has a plurality of connection terminals protruding in directions away from each other, and
the plurality of connection terminals and the circuit board are joined by a joining member to be electrically conductive;
a circuit chamber which accommodates the circuit board; and
a sub-passage which is arranged on a lateral side of the circuit chamber and through which a gas to be measured flows,
wherein
the flow rate detector in the support body is arranged in the sub-passage,
in the support body, a part including the flow rate detector protrudes in a direction orthogonal to a passage direction of the sub-passage, and the plurality of connection terminals are arranged to be divided into one side and another side in the passage direction of the sub-passage,
in the circuit board, a first sensor configured to detect a first physical quantity and a second sensor configured to detect a second physical quantity are arranged on the one side and the other side in the passage direction of the sub-passage with the accommodating portion interposed between the first sensor and the second sensor.

2. The physical quantity detecting device according to claim 1, wherein
proximal end portions of the plurality of connection terminals abut on the circuit board,
distal end portions of the plurality of connection terminals have a predetermined gap with respect to the circuit board, and
the joining member is interposed between the distal end portions of the plurality of connection terminals and the circuit board.

3. The physical quantity detecting device according to claim 2, wherein
each of the plurality of connection terminals has:
a protruding portion that protrudes straight from the support body;
a rising portion that rises by being bent to one side in the thickness direction of the support body at a distal end of the protruding portion;
a falling portion that is continuous with the rising portion and falls by being bent to another side in the thickness direction of the support body at a first bending height position; and
an end portion that is continuous with the falling portion and protrudes in a direction away from the support body at a second bending height position, and
a slope of the falling portion is gentler than a slope of the rising portion.

4. The physical quantity detecting device according to claim 3, wherein the joining member is solder.

* * * * *